(12) United States Patent
Patterson et al.

(10) Patent No.: US 6,195,839 B1
(45) Date of Patent: Mar. 6, 2001

(54) HINGED DETENT

(75) Inventors: Gregory S. Patterson, Morrisville; Thomas D. Snyder, Raleigh, both of NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 08/926,146

(22) Filed: Sep. 9, 1997

(51) Int. Cl.[7] ................................................... B41J 50/10
(52) U.S. Cl. .............................. 16/334; 16/328; 16/329; 400/682; 400/489
(58) Field of Search ........................... 16/328, 329, 331, 16/332, 334; 361/680; 400/682, 489, 472

(56) References Cited

U.S. PATENT DOCUMENTS

| | | | |
|---|---|---|---|
| 1,031,287 | * 7/1912 | Page | 16/332 |
| 1,180,669 | * 4/1916 | Oellrich et al. | 16/334 |
| 2,635,281 | 4/1953 | Feldberg | 16/141 |
| 3,561,287 | * 2/1971 | Lawrence, Jr. | 16/121 |
| 3,990,565 | * 11/1976 | Felton et al. | 400/489 X |
| 4,580,829 | * 4/1986 | Matheopoulos | 16/334 |
| 5,022,118 | * 6/1991 | Wan-Li | 16/334 |
| 5,073,050 | * 12/1991 | Andrews | 400/489 X |
| 5,267,127 | * 11/1993 | Pollitt | 361/680 |
| 5,318,367 | * 6/1994 | Braun et al. | 400/489 X |
| 5,412,842 | * 5/1995 | Riblett | 16/334 |
| 5,463,925 | * 11/1995 | Galocy | 400/489 X |
| 5,507,013 | * 4/1996 | Weadon et al. | 16/334 |
| 5,574,481 | * 11/1996 | Lee | 400/489 X |
| 5,596,480 | * 1/1997 | Manser et al. | 361/680 |
| 5,612,691 | * 3/1997 | Murmann | 400/489 X |
| 5,615,081 | * 3/1997 | Ma | 361/680 |
| 5,651,622 | * 7/1997 | Kim | 400/489 |
| 5,659,307 | * 8/1997 | Karidis et al. | 400/489 X |
| 5,734,548 | * 3/1998 | Park | 361/680 |
| 5,769,551 | * 6/1998 | Tsai et al. | 400/489 |
| 5,841,635 | * 11/1998 | Sadler et al. | 361/749 |

FOREIGN PATENT DOCUMENTS

| | | | |
|---|---|---|---|
| 72638/81 | 1/1982 | (AU) . | |
| 1 000 256 B | 1/1957 | (DE) . | |
| 42 39 358 A1 | 5/1994 | (DE) . | |
| 61519 | * 11/1943 | (DK) | 16/331 |
| 0 640 489 A2 | 3/1995 | (EP) . | |
| 0 732 474 A1 | 9/1996 | (EP) . | |
| 0 772 333 A2 | 5/1997 | (EP) . | |
| 0 777 369 A2 | 6/1997 | (EP) . | |
| 100273 | 3/1998 | (EP) . | |
| 1250349 | * 11/1960 | (FR) | 16/334 |
| 2089301 | 1/1972 | (FR) . | |
| 2 629 510 A1 | 10/1989 | (FR) . | |
| 404854 | * 1/1934 | (GB) | 16/332 |
| 1560723 | * 2/1980 | (GB) | 16/334 |
| 2 300 880 | 11/1996 | (GB) . | |
| 2 303 427 | 2/1997 | (GB) . | |
| 107730 | * 6/1943 | (SE) | 16/334 |
| WO 90/15728 | 2/1990 | (WO) . | |

* cited by examiner

Primary Examiner—Anthony Knight
(74) Attorney, Agent, or Firm—Jenkens & Gilchrist, P.C.

(57) ABSTRACT

Two pivoting portions of a product are connected by a hinged detent. The hinged detent provides a snap feel when the product halves are closed or opened to an operable angle. It also allows for the placement of wires and connectors within the hinge. The hinged detent design further enables easy vertical axis assembly and provides for one of a multiple of operable angles to be factory-set. In adjustable hinge detents, a dial or similar mechanism can be rotated to adjust and set the desired operable angle to which the hinged product halves will be opened. Locating elements are forcibly disengaged from one set of adjusting recesses in the adjustable hinge, then rotated to different adjusting recesses of the hinge, and finally permitted to reengage the adjustable hinge in the new adjusting recesses. This mechanism permits a multitude of operable angles to be selected. Each time the product portions are reopened, they will automatically open to the previously selected angle. The adjustable hinge detent can be used, for example, to connect two v-keyboard halves, a screen to a laptop base, two components of collapsing headphones, or two parts of an adjustable stand.

32 Claims, 23 Drawing Sheets

HINGED DETENT

BACKGROUND OF THE INVENTION

1. Technical Field of the Invention

The present invention relates to hinged detents, and in particular, to hinged detents with simplified structures and adjustable operable angles of rotation.

2. Description of Related Art

Keyboards have long been used as input devices for both mechanical and electrical machines. Recently, keyboards have been used as the predominant input device for electronic devices. For example, keyboards are vital components in computers and other terminals, such as versatile telephones.

Unfortunately, the original design of the keyboard incorporates a single rectangular block of keys. This design causes discomfort to many users. To remedy this deficiency, many modern keyboards have been redesigned by dividing the single block of keys into two smaller blocks that are angled apart from one another, often called v-keyboards. Many keyboard users consider this design to be far more ergonomic. In fact, it alleviates or even eliminates pain and discomfort for many of these users.

Prior art keyboards typically employ one of two techniques to create the v-angle. First, the two halves may be separate with no connecting hinge. This technique results in a fragile and unreliable v-angle. Second, the halves may be connected by a hinge that is secured with a screw. This technique, though, results in a hinge that is difficult, time-consuming, and cumbersome to use, especially in portable devices. In short, no prior art v-keyboard simply and effectively secures and maintains a v-angle.

Looking at small portable consumer electronics products in general, many have hinges that incorporate detent mechanisms. Examples include cell phone flip doors, portable cassette player doors, and swivel antennas. Usually, these prior art detent hinges are composed entirely of plastic components, which is undesirable inasmuch as plastic parts do not wear well against each other. Furthermore, assembly of prior art detents is often difficult.

Many of these products integrate simple detent mechanisms into the plastics of the hinge itself. For example, there is a post-and-hole design wherein a rounded post element protrudes from one side of the hinge towards the other, which has a hole or recessed area for the post to nest into. As the hinge rotates, the post rides out of the hole and slides, under stress, into a new hole. The post then snaps into the new hole, thereby creating the detent feel and holding the product in the operable detent position. Assembly usually consists of forcing the two halves together until they snap together in alignment. Other more complicated prior art designs include camming surfaces and springs in the hinge mechanics.

The primary deficiency of prior art detents is that they wear out quickly. This is especially true of detents molded into the plastics of the hinge because plastics often do not wear well against each other; consequently, the post side usually breaks off or wears away. Nevertheless, this design is frequently used because of its low cost and relative ease of assembly. While it is known to use different materials for parts that wear on each other, the post still tends to eventually break away in part because it is so frequently under stress for relatively long periods of time.

Another drawback to the prior art molded-in solutions is that the detent position cannot be changed, nor can the detent mechanism be easily removed if so desired. The primary drawback of the more complicated solutions, e.g., leaf springs and cams, is just that; they are more complicated. The complications usually lead to higher costs, increased assembly time, a greater number of parts, and more reliability issues. Moreover, these designs occupy significant space within the hinge itself. This is undesirable in today's consumer electronics products in which wires, circuits, connectors, etc. are routed through hinge components and therefore compete for this real estate. In fact, routing wires through the hinge is necessary when the hinge is employed in a v-keyboard because the left and right halves must be connected electrically.

Another deficiency of the prior art with respect to v-keyboards is that they often incorporate a fixed angle between the two blocks; however, a single, set angle is not optimum for all keyboard users. Consequently, many of these v-keyboards permit the angle to be adjusted, which is important because the angle of the v is a prime factor determining the comfort and useability of the keyboard.

While the benefits of adjusting a v-keyboard are significant, unfortunately the difficulty in finding the optimum v-angle is equally significant.

In fact, the process of finding the optimum v-angle is awkward and time-consuming. An initial v-angle must be selected, the keyboard must be secured at this angle (often the prior art used a nut or bolt to secure a given v-angle), and then the keyboard must be used for a period of time. Once the keyboard user determined in which direction to change the v-angle, the process would have to be repeated. And when the direction could not be determined, the direction would have to be chosen by chance, which adds another step in the process. Eventually, after numerous v-angles had been tested, an optimum v-angle was located.

A further problem with these prior adjustable v-keyboards is that each time the v-angle of the keyboard was changed, this lengthy process had to be performed again. This would have occurred frequently, for example, when two keyboard users routinely shared one keyboard. Furthermore, it would occur even more frequently if the v-keyboard concept were to be applied to portable devices whose keyboards are designed to fold to enable compact storage and transport.

Therefore, one object of the invention is to provide a simplified, yet easy to use, hinged detent that is capable of connecting two halves of a v-keyboard and maintaining a v-angle.

Another object of the invention is to provide a low cost hinged detent that is easy to assemble.

Another object of the invention is to provide a hinged detent with ample room for the routing of wires, contacts, etc. through the hinge.

Yet another object of the invention is to provide a hinged detent that can be easily modified or removed at a manufacturing location should a product's requirements for a detent or a specific detent position change during a product's life cycle or across a product's family.

Another object is to provide a method to have v-keyboards, once set to an optimum v-angle, automatically open to the optimum v-angle.

Another object is to provide a method for a v-keyboard to "remember" the preferred v-angle.

Yet another object is to provide a method to be able to easily and conveniently set the optimum v-angle.

Yet another object is to provide a method to be able to easily and conveniently set the optimum v-angle without tools.

A further object is to provide a method for the keyboard user to be able to quickly relocate a preferred v-angle, even when another keyboard user has changed the stored v-angle, without going through a long process.

A still further object is to provide a method to set the v-angle with a dial, or visible tip, once the v-keyboard is in its desired operating position.

A general object is to provide an adjustable hinge detent usable in a variety of products.

The aforementioned deficiencies of the prior art are remedied by the above stated objects of the invention, which invention is described and explained fully below.

SUMMARY OF THE INVENTION

The above objects and others are achieved with a hinged detent that connects two pivoting portions of a product. The simplified hinged detent includes a detent instrument and recesses (such as notches and grooves) that provide a snap feel when the product halves are closed or opened to an operable angle. Furthermore, the hinged detent can have a plurality of factory-set operable angles. The detent can be easily assembled along the z-axis, and it provides room for the routing of wires, connectors, etc. during assembly. Additionally, the hinged detent lasts longer by manufacturing the detent instrument out of material that differs from the remainder of the detent.

In adjustable embodiments, a dial or similar mechanism can be rotated to adjust and set the desired operable angle to which the hinged product halves are to be opened. Locating elements are forcibly disengaged from one set of adjusting recesses in the adjustable hinge, then rotated to different adjusting recesses in the hinge, and finally permitted to reengage the adjustable hinge in the new adjusting recesses. This mechanism permits a multitude of operable angles to be selected. Each time the product portions are reopened, they can automatically open to the previously selected angle.

Returning to a preferred embodiment, a v-keyboard, it should further be noted that utilizing a v-keyboard at the optimum v-angle would be even more troubling for portable devices with keyboards that must fold for easier transport. Each time that a portable device was to be moved, the v-angle setting process would have to be performed again. Hence, such portable devices would virtually guarantee that the time-consuming process would have to be performed frequently. By enabling the v-keyboard to be automatically reopened to the previously set v-angle, the adjustable hinge detent of the current invention facilitates the utilization of v-keyboards in folding, portable devices.

In one adjustable embodiment, a detent instrument is trapped in a locating groove in the first of two product portions, e.g., one of two halves of a v-keyboard joined by an adjustable hinge detent of the current invention. It is also held in place by a recess in the second product portion. As the portions pivot with respect to one another, the detent instrument is forced out of the recess and carried along a track by the locating groove to a notch, the position of which is adjustable and determines the angle that the device is to be opened. The detent feel feature snaps the detent instrument into the notch and completes the opening process. The procedure for closing is merely the reverse of the opening process.

The hinged detent of the current invention, in both the adjustable and non-adjustable embodiments, is not useful only for keyboards. It can also be advantageously used to control, for example, the angle to which a laptop screen opens, the amount collapsible headphones unfold, or the angle a stand (for example, for a telephone) is tilted. It can additionally be used to provide a detent position and feel in, for example, cell phone flip doors, portable cassette player doors, and swivel antennas.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Preferred embodiments of the present invention and their advantages are best understood by referring to FIGS. 1A–18 of the drawings, like numerals being used for like and corresponding parts of the various drawings.

Referring to FIGS. 1A–3B, a non-adjustable hinged detent embodiment for two rotatable parts is illustrated. These diagrams of a non-adjustable implementation illuminate the details of the non-adjustable implementation and additionally provide a simplified foundation for understanding the adjustable implementation, which is described subsequently.

Figure 1A:
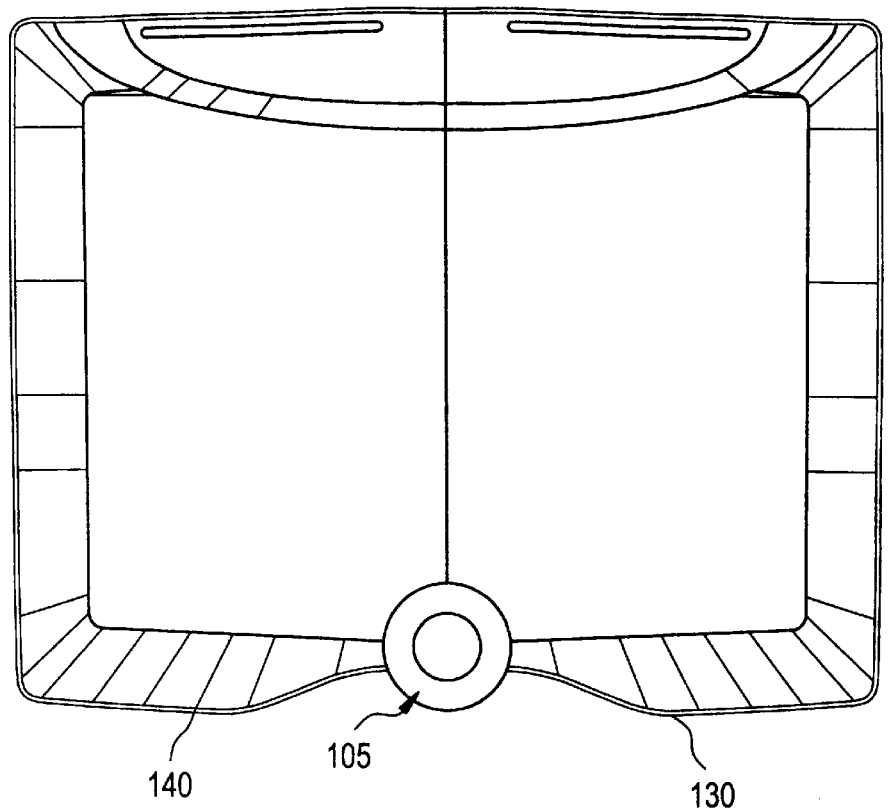
FIG. 1A illustrates a bottom view of an apparatus in the closed position according to a non-adjustable embodiment of the invention.

Referring to FIG. 1A, a non-adjustable (Non-adjustable in the sense that the operable angle cannot be adjusted in the ordinary course of operation; a subsequently-described, non-adjustable embodiment does permit the operable angle, or detent position, to be selected during assembly or whenever the detent is later disassembled. This subsequently-described embodiment also permits, in the alternative, a plurality of detent positions, i.e., two or more operable angles, to be rotated to and then snapped into. Neither alternative of this subsequently-described, non-adjustable embodiment includes an adjusting dial/detent adjustor, however.) hinge detent apparatus is illustrated from a bottom view in the closed position. Non-adjustable hinge 105 connects right-hand keyboard 140 and left-hand keyboard 130.

It should be noted that the incorporation of the non-adjustable hinge detent apparatus into a keyboard is by way of example only. It can be used, for instance, to control the angle to which a laptop screen opens, the amount collapsible headphones unfold, or the angle a stand (for example, for a telephone) is tilted. It can additionally be used to provide a detent position and feel in, for example, cell phone flip doors, portable cassette player doors, and swivel antennas.

Figure 1B:
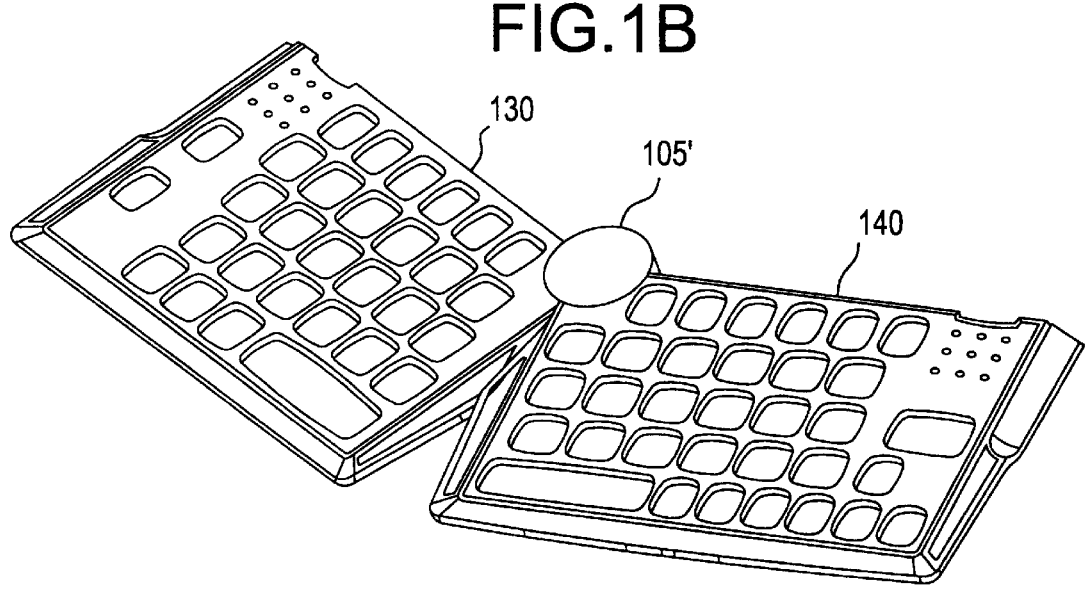
FIG. 1B illustrates a top view of an apparatus in the open position according to a non-adjustable embodiment of the invention.

Referring to FIG. 1B, a keyboard is pictured from above in the open position. Capped hinge 105' connects left-hand keyboard 130 to right-hand keyboard 140, and capped hinge 105' holds them in an open detent position as illustrated. (In FIG. 1B, the keys are not pictured.)

It is important to note that other detent instruments, instead of a detent ball, can be used. For example, a detent cylinder can be used. Furthermore, other detent implements, beyond detent instruments (e.g., spring-operated detent balls and detent cylinders), can be used in the adjustable embodiments. A non-exclusive list of additional detent implements includes post-and-hole detents, detent dogs, detent catches, and camming surfaces and springs. It should be noted that detent balls and detent cylinders are often, but not always, spring-operated.

Figure 2A:
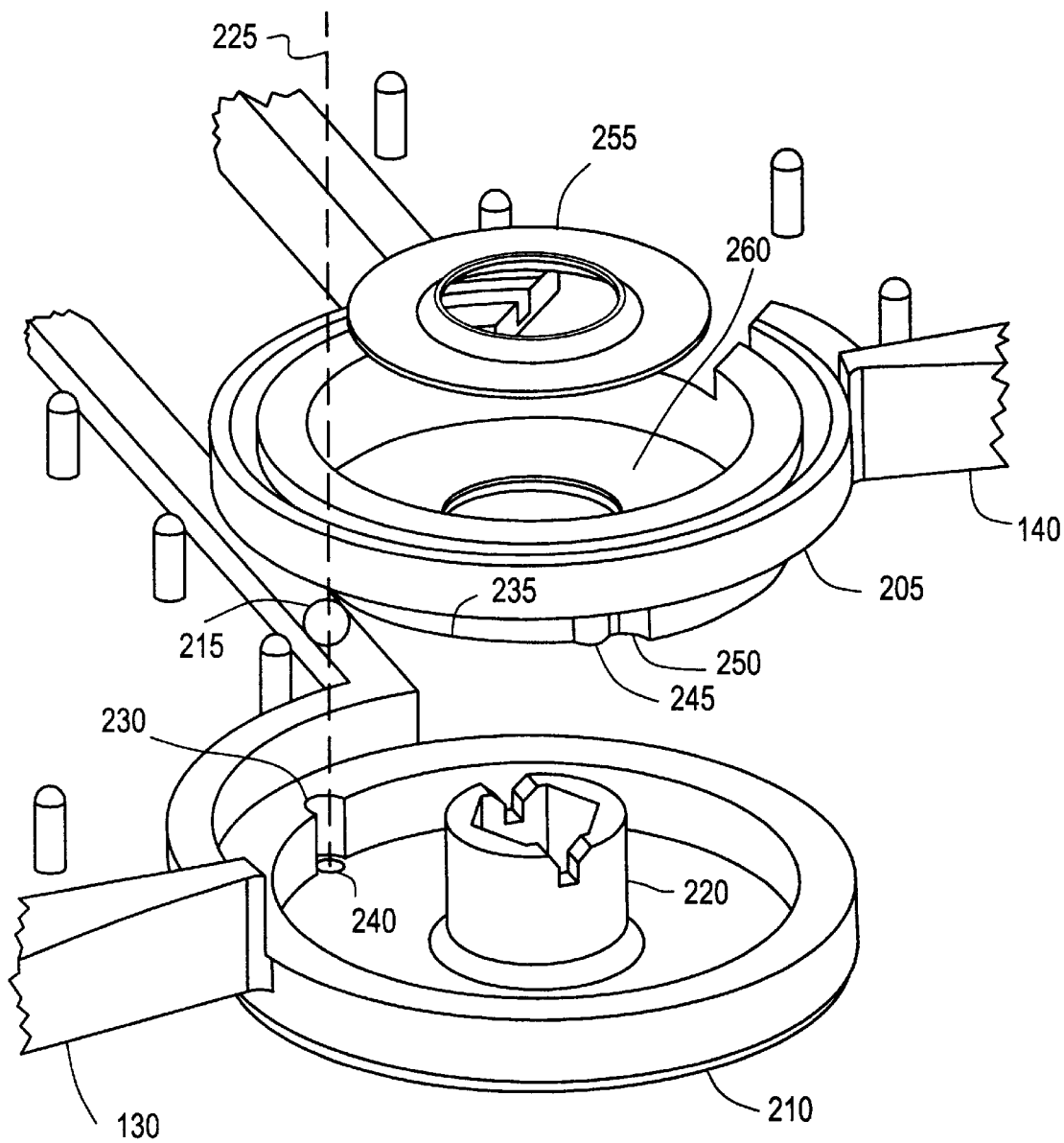
FIG. 2A illustrates an exploded view from above of a first non-adjustable embodiment.
Figure 2B:
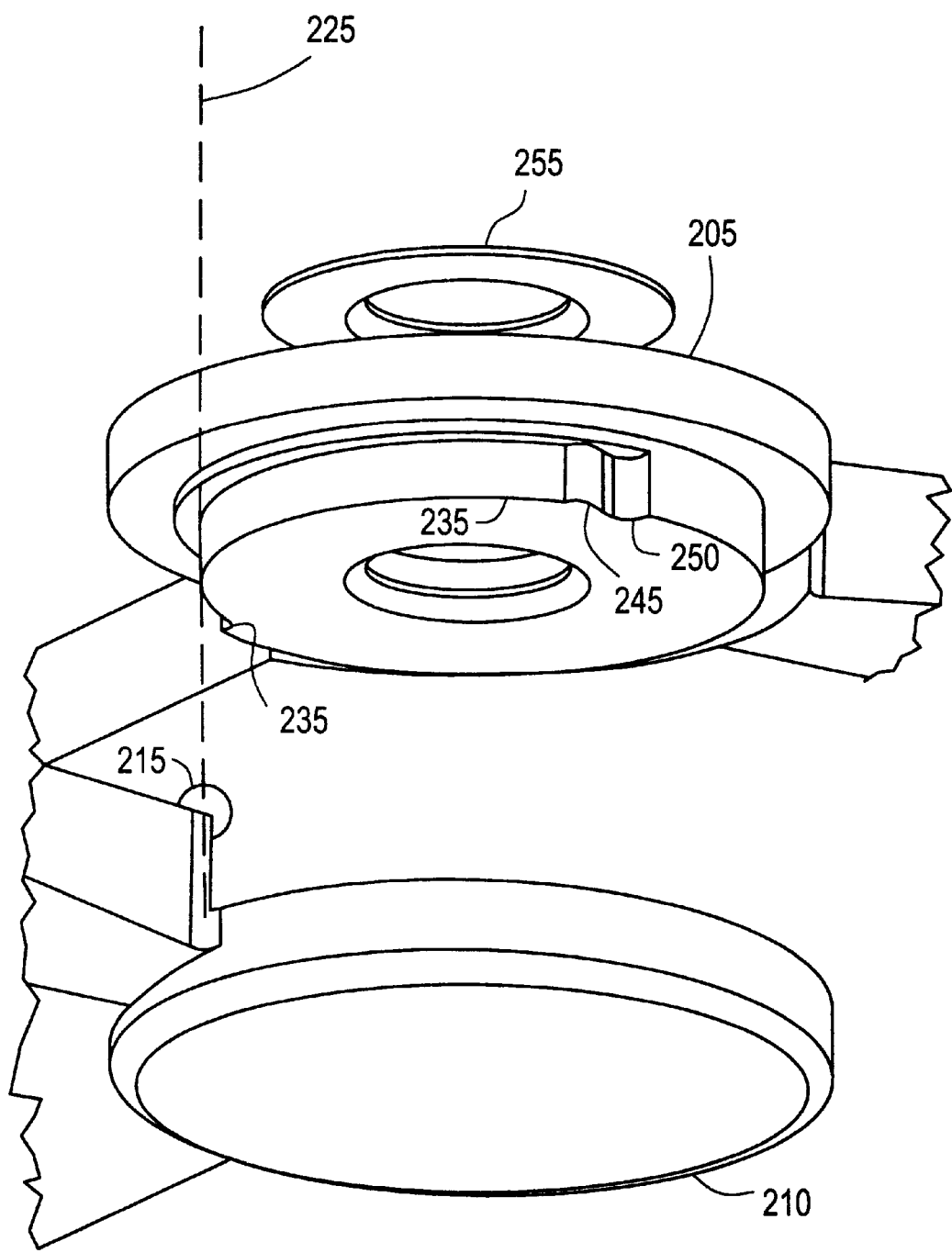
FIG. 2B illustrates an exploded view from below of a first non-adjustable embodiment.

Referring now to FIGS. 2A and 2B, a first embodiment of the non-adjustable hinge detent apparatus is shown. Left-hand keyboard 130 preferably adjoins housing left 210. Housing left 210 supports hinge shaft 220 and defines ball recess 240. (Ball recess 240 is a term for this preferred embodiment. The recess can be for a cylinder; hence, cylinder recess is an alternative term. Furthermore, a general term is instrument mate. Instrument mate includes both recesses and bumps. Essentially, it includes any texture, convex surface, or concave surface that can help locating groove 230 contain the detent instrument. For instance, a cylindrical detent instrument with a concave bottom could mate with a convex bump instrument mate.) Locating groove 230 is also defined by housing left 210. Detent ball 215 is contained within locating groove 230 after assembly. Right-hand keyboard 140 preferably adjoins housing right 205. Housing right 205 includes ball groove 235 (generally termed a detent instrument groove) and detent hump 245. Detent groove 250 is defined by housing right 205. Furthermore, large pocket 260 is also defined by housing right 205 in conjunction with hinge shaft 220. Large pocket 260 effectively provides an area between hinge shaft 220 and the hinge walls for routing of wires, cables, connectors, etc. This routing ability is desired in many of today's new products and required in v-keyboards where the left and right halves must be connected electrically.

As shown by assembly axis (vertical) 225, the hinge apparatus can be assembled along the z-axis. Vertical assembly is preferred for high volume and automated manufacturing situations. Assembly can be accomplished by placing detent ball 215 into ball recess 240, lowering housing right 205 onto housing left 210 (trapping detent ball 215), and then pressing hinge fastener 255 over hinge shaft 220. Hinge fastener 255 holds the assembly together. It should be noted that other techniques to attach the two housings together can be used. One example is the inclusion of snaps on hinge shaft 220, which eliminates the need for a hinge fastener 255. Without hinge fastener 255, housing right 205 could include or be attached to a covering surface to contain wires, etc. in large pocket 260.

Continuing with FIGS. 2A and 2B, the hinge operates as follows. Detent ball 215 always remains in locating groove 230. Thus, it travels with housing left 210. By way of example, as right-hand keyboard 140 and therefore housing right 205 rotate about hinge shaft 220, detent ball 215 rides freely (not under stress) from the beginning to the end of ball groove 235. Detent ball 215 must squeeze past detent hump 245 by springing the plastic material out of the way. Detent ball 215 then snaps into detent groove 250. In this position, the detent mechanism is again not under stress and is then holding the housings open. An opposite motion can return the keyboard halves and housings to a closed position. Another detent hump and detent groove pair could be included at the beginning of ball groove 235 for a detent feel and effect at closing.

The detent hump area is preferably a plastic spring element with sufficient stiffness to achieve the desired detent snap feel. The detent instrument, a ball as described above in a preferred embodiment, is preferably of a material different from the remainder of the hinge, e.g., dissimilar material to plastic. With proper construction, the combination of the plastic spring element with the dissimilar material of the detent instrument greatly reduces the wear on the detent hump. The device thus has a longer life cycle. Moreover, ball groove 235 enables there to be stress and friction in the system only at the point that detent ball 215 passes detent hump 245. This further reduces wear as compared to prior art designs.

Returning to an operational description, when detent ball 215 clicks into detent groove 250, the v-keyboard is in an open position. This corresponds to a single, non-adjustable operable angle of a non-adjustable hinge detent apparatus. It should be noted here that multiple non-adjustable operable angles can be implemented into the non-adjustable hinge detent apparatus. Multiple triplets of a detent hump/detent groove/detent hump nature can be placed along (a possibly elongated) ball groove 235. A keyboard user can then feel several clicks as the available operable angles are presented by rotating housing left 210 with respect to housing right 205.

Figure 3A:
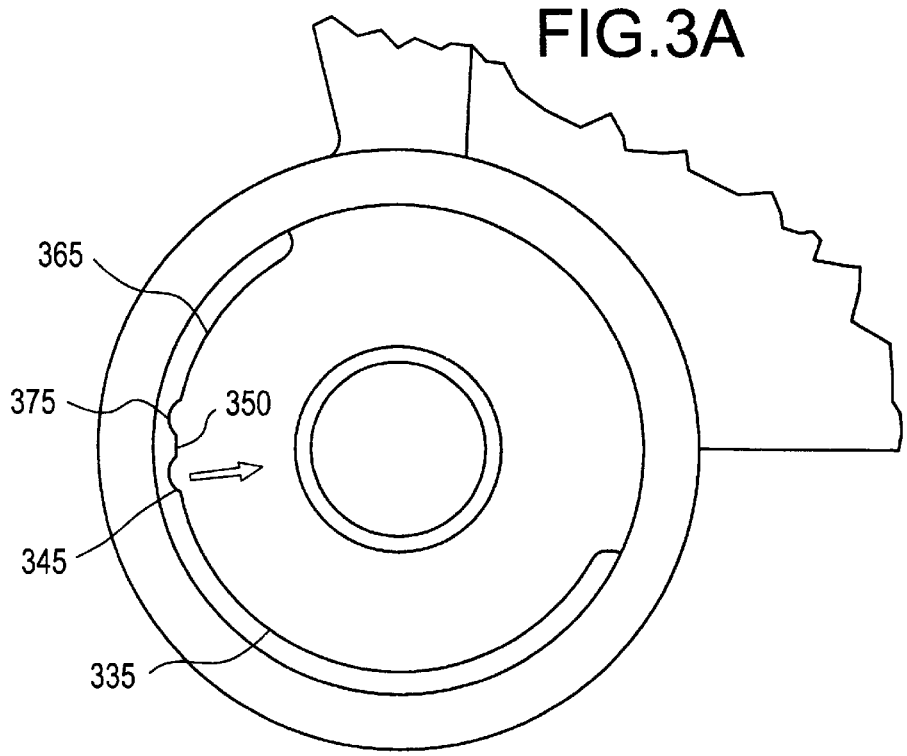
FIG. 3A illustrates a view from below of the housing right of a second non-adjustable embodiment.
Figure 3B:
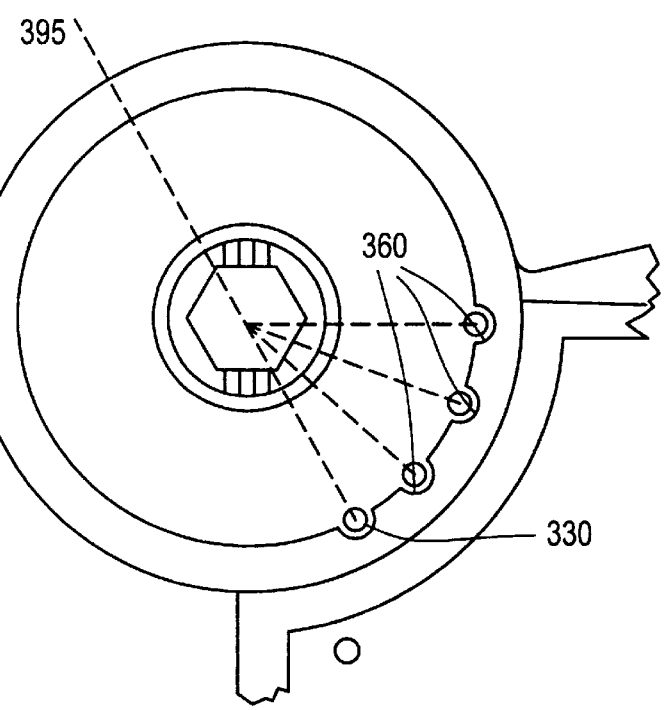
FIG. 3B illustrates a view from above of the housing left of a second non-adjustable embodiment.

Referring to FIGS. 3A and 3B, a second non-adjustable embodiment is illustrated. An embodiment that uses FIG. 3A and 3B together also has multiple operable angles. FIG. 3A illustrates a view from below of housing right, and FIG. 3B illustrates a view from above of housing left. FIG. 3A shows the locations of original ball groove 335, original detent hump 345, and original detent groove 350. On the opposite side of original detent groove 350 to original detent hump 345 is added detent hump 375. Beyond added detent hump 375 is added ball groove 365. FIG. 3B shows the locations of original locating groove 330, added locating grooves 360, and available detents 395. As pictured, original locating groove 330 corresponds to the fourth detent position available and the fourth detent instrument, preferably a ball in this embodiment.

As shown in FIG. 3B, multiple detent instruments, e.g., balls or cylinders, can be placed within original locating groove 330 and added locating grooves 360. If only one detent instrument is inserted, then only one detent position, or operable angle, is available. However, the availability of multiple locating grooves enables the manufacturer to select the desired detent position during assembly. Furthermore, the detent position can be changed by disassembling the hinge and placing the detent instrument in a different locating groove. In this context, the housing left of FIG. 3B can be used with the housing right of FIGS. 2A and 2B.

Alternatively, the housing left of FIG. 3B can be paired with the housing right of FIG. 3A. When paired with the housing right of FIG. 3A, a detent instrument can be inserted into multiple, indeed all, locating grooves to enable multiple detent positions to be able to be snapped into. After the hinge has been snapped into the first available detent position; the first detent ball can squeeze past added detent hump 375 and into added ball groove 365. The first detent ball travels in the first locating groove along added ball groove 365 until the second detent ball squeezes past original detent hump 345 and into original detent groove 350. This process can continue through the fourth available detent position, which corresponds to original locating groove 330.

These non-adjustable hinge detent designs provide several additional advantages over the prior art. The detent instrument can be removed entirely if a detent should no longer by needed in the hinge. Also, a slightly smaller detent instrument can be used if less detent force is desired, or a larger detent instrument can be used if more detent force is desired.

It is noted that reading and understanding the adjustable embodiments below will reveal to the artisan further details that can be incorporated into non-adjustable embodiments and will suggest possible modifications as well. Moreover, understanding the non-adjustable implementations will, conversely, illuminate aspects and possible modifications of the adjustable implementation.

Figure 4B:
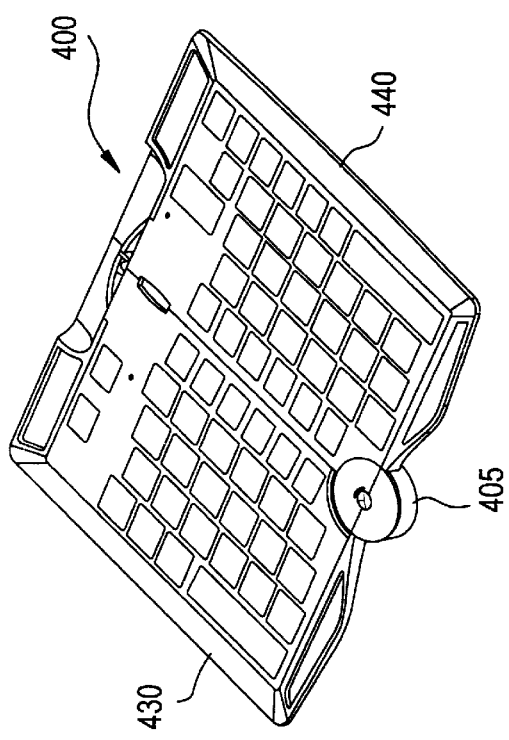
FIG. 4B illustrates an apparatus in the closed position according to a first adjustable embodiment of the invention.
Figure 4A:
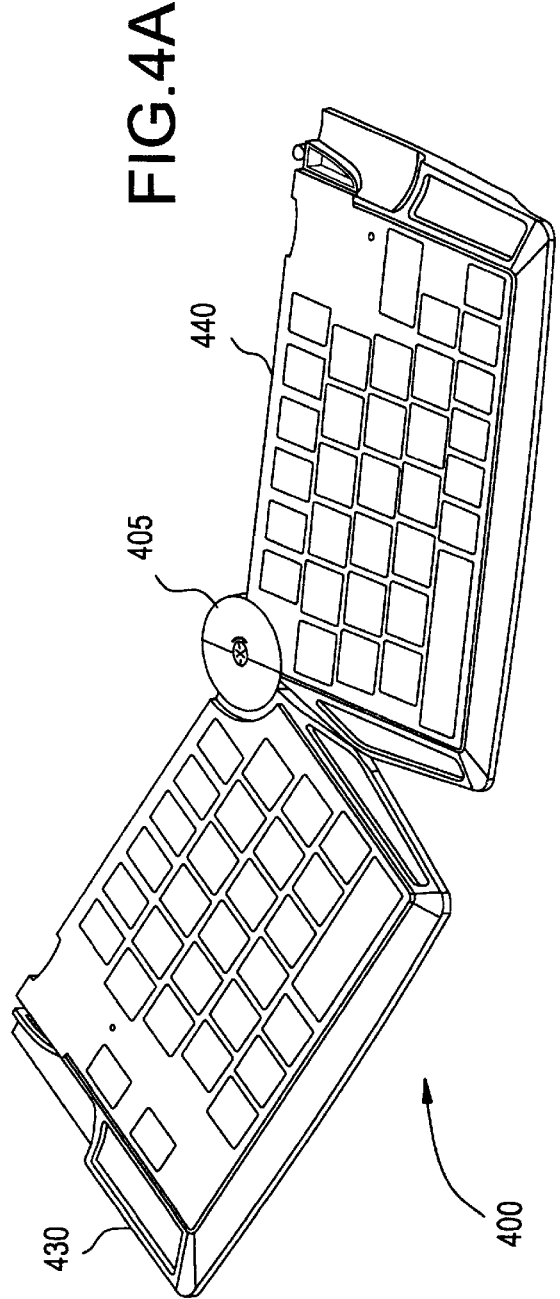
FIG. 4A illustrates an apparatus in the open position according to a first adjustable embodiment of the invention.

Referring to FIG. 4A, an apparatus, which is preferably a v-angled keyboard, is illustrated according to the first adjustable embodiment. While a keyboard is pictured, it should be remembered that this illustration is by way of example only and should not be taken to be limiting. The adjustable hinge detent assembly aspect of the present invention is equally usable in a variety of other devices. For example, it can be used to control the angle to which a laptop screen opens, the amount collapsible headphones unfold, or the angle a stand (for example, for a telephone) is tilted. Furthermore, it can additionally be used to provide a detent position and feel in, for example, cell phone flip doors, portable cassette player doors, and swivel antennas. Returning to FIG. 4A, the keyboard 400 is shown in an assembled view in open position. Now referring to FIG. 4B, the keyboard 400 is shown in an assembled view in closed position. In both FIGS. 4A and 4B, the LH keyboard 430 and the RH keyboard 440 are shown joined by an adjustable hinge 405.

Figure 5A:
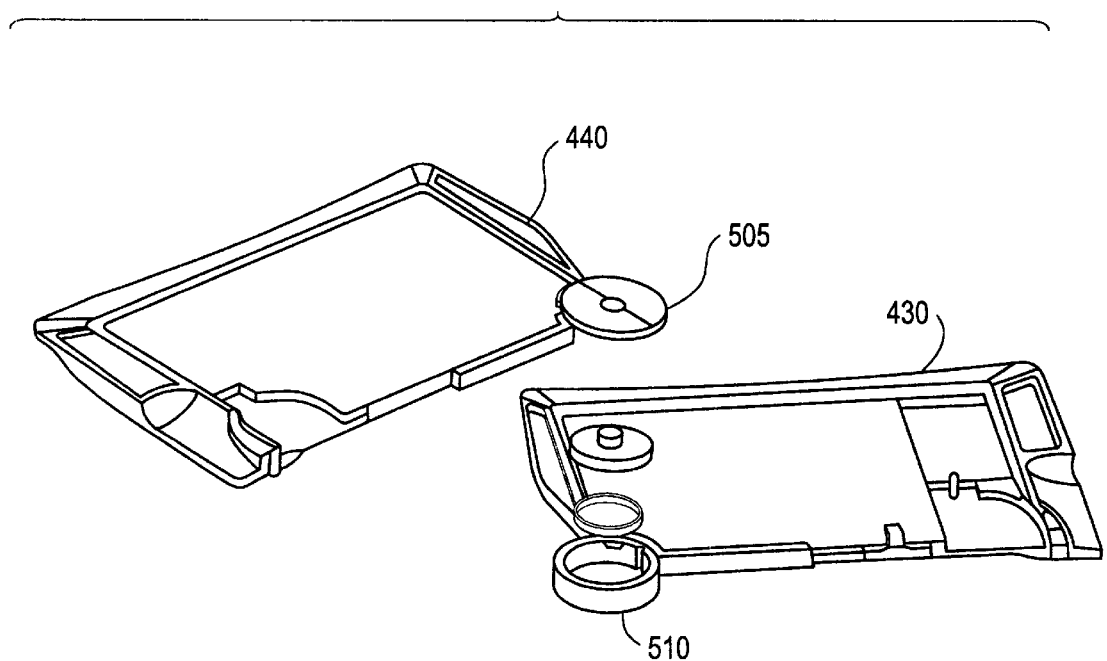
FIGS. 5A and 5B illustrate exploded views according to the first adjustable embodiment.
Figure 5B:
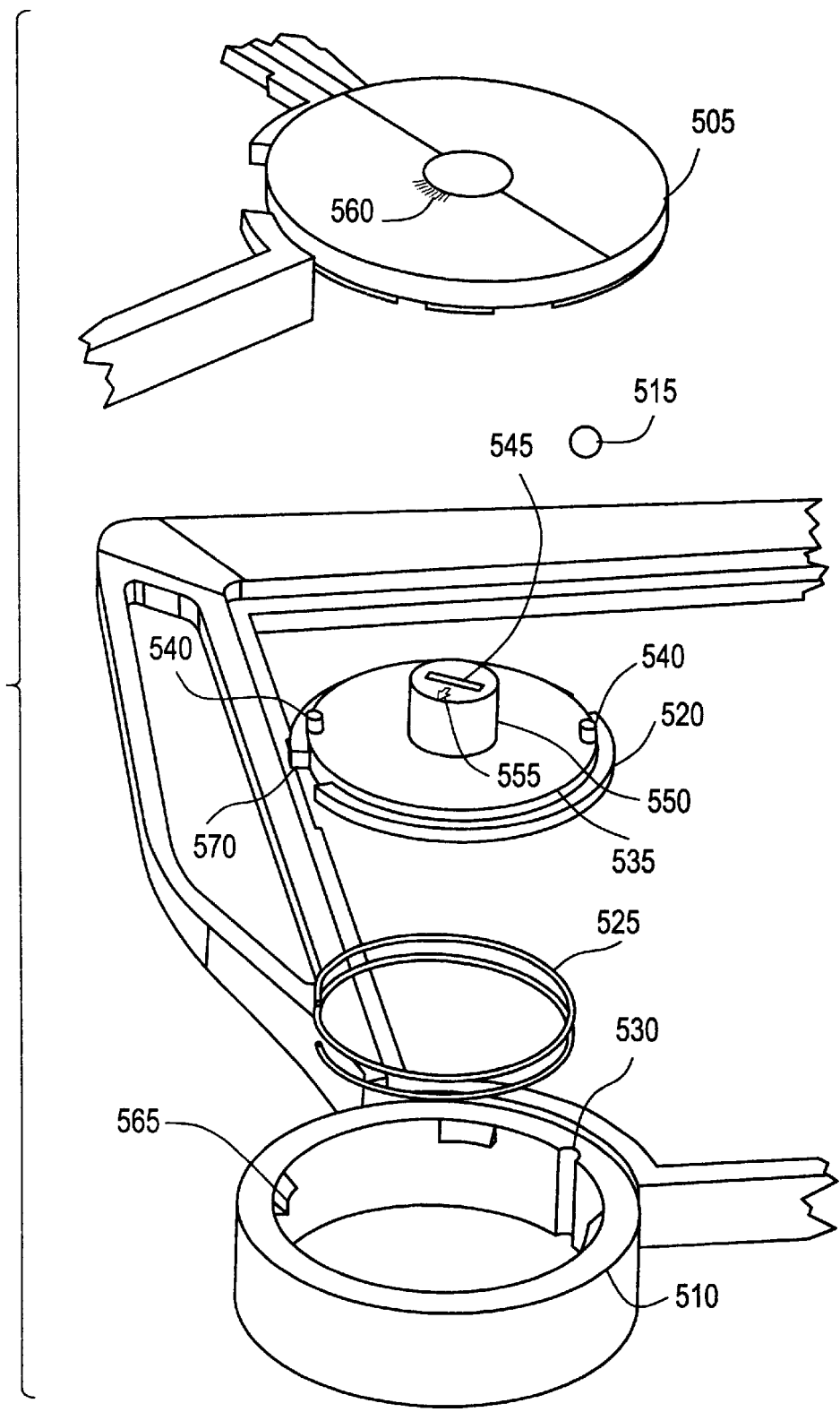

Now referring to FIGS. 5A and 5B, the upper hinge area 505 and the lower hinge area 510 of the first adjustable embodiment are pictured. FIG. 5A additionally shows where upper hinge area 505 is connected to RH keyboard 440 and where lower hinge area 510 is connected to LH keyboard 430. Also, as in the non-adjustable hinge of FIGS. 1–3, the adjustable hinge of FIGS. 5A and 5B includes a detent ball 515 (pictured in 5B only). (Here again, as in all other embodiments of the current invention, it is important to note that other detent instruments, instead of a detent ball, can be used. For example, a detent cylinder can be used. Furthermore, other detent implements, beyond detent instruments (e.g., spring-operated detent balls and detent cylinders), can be used in the adjustable embodiments. A non-exclusive list of additional detent implements includes post-and-hole detents, detent dogs, detent catches, and camming surfaces and springs. It should be noted that detent balls and detent cylinders are often, but not always, spring-operated.)

Continuing with FIG. 5B only, the indication features of the invention are diagramed at 560. The indication features 560 indicate the range of available operable angles to which the adjustable hinge detent can be set. In a preferred adjustable embodiment, they can be, for example, (i) an array of radiating lines, (ii) an arc of numbers that represent the operable angles in degrees, or (iii) a combination of both. In operation, the v-keyboard can be set to a desired v-angle by pointing the arrow indicator 555 to the corresponding element in the indication features 560.

In this first adjustable embodiment, this is preferably accomplished by inserting a tool, e.g., a screwdriver, into slot 545, which is disposed on visible tip 550, and applying a downward force. The downward force applies pressure onto biasing spring 525 and permits the detent adjuster 520 to descend toward the bottom of lower hinge area 510. As will be explained more fully below, once descended, the detent adjuster 520 can be rotated into a new position, i.e., the arrow indicator 555 can be rotated toward a new element in the indication features 560. It should also be noted that while the detent adjustor is pictured here as preferably substantially circular, other shapes can be employed by an artisan without departing from the scope and spirit of the invention.

As is diagramed later (and termed in that context a dial), the visible tip as pictured at 550 can be slightly modified so that it can be rotated by hand. Such a modification would be within the ordinary skill of an artisan. Thus, visible tips can include dials, and vice versa.

The detent adjuster 520 also includes the visible tip 550, a raised section 535, and one or more locating pins 540. One or more clearances for snaps 570 are provided with detent adjuster 520 to provide clearance for one or more snap features 565, which are attached to lower hinge area 510. Finally, lower hinge area 510 also includes a locating groove 530, which is equivalent to a recess.

Figure 6A:
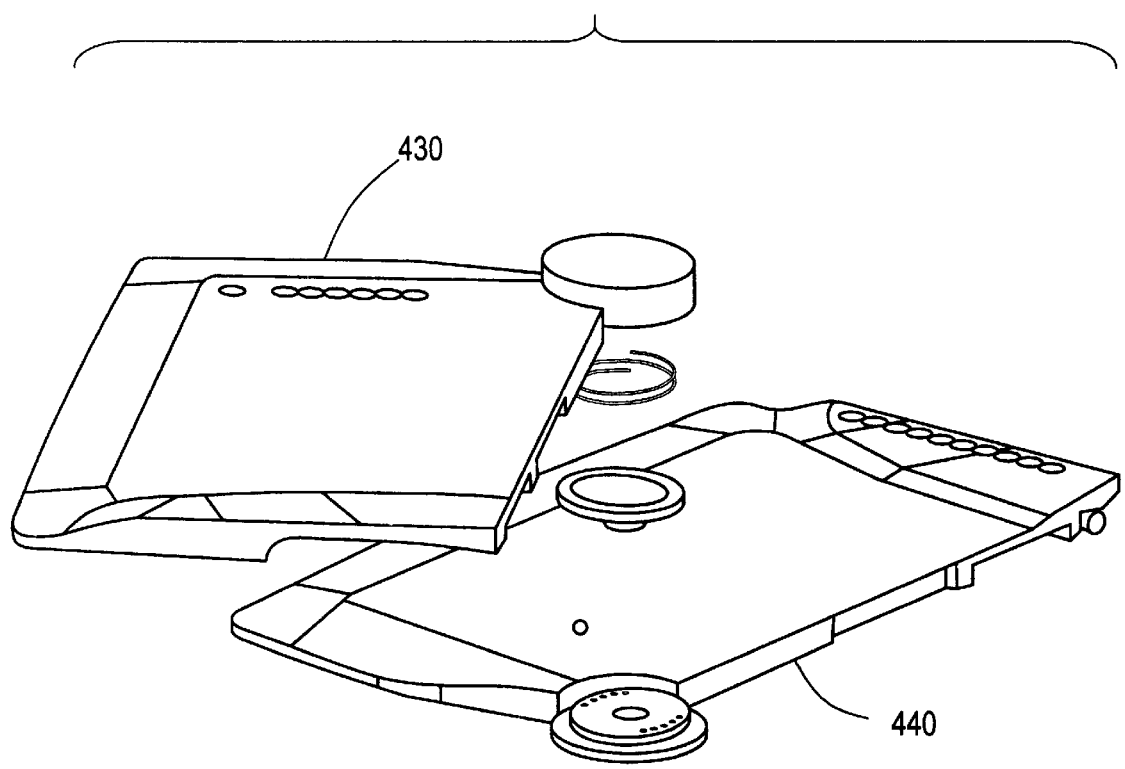
FIGS. 6A and 6B also illustrate exploded views according to the first adjustable embodiment.
Figure 6B:
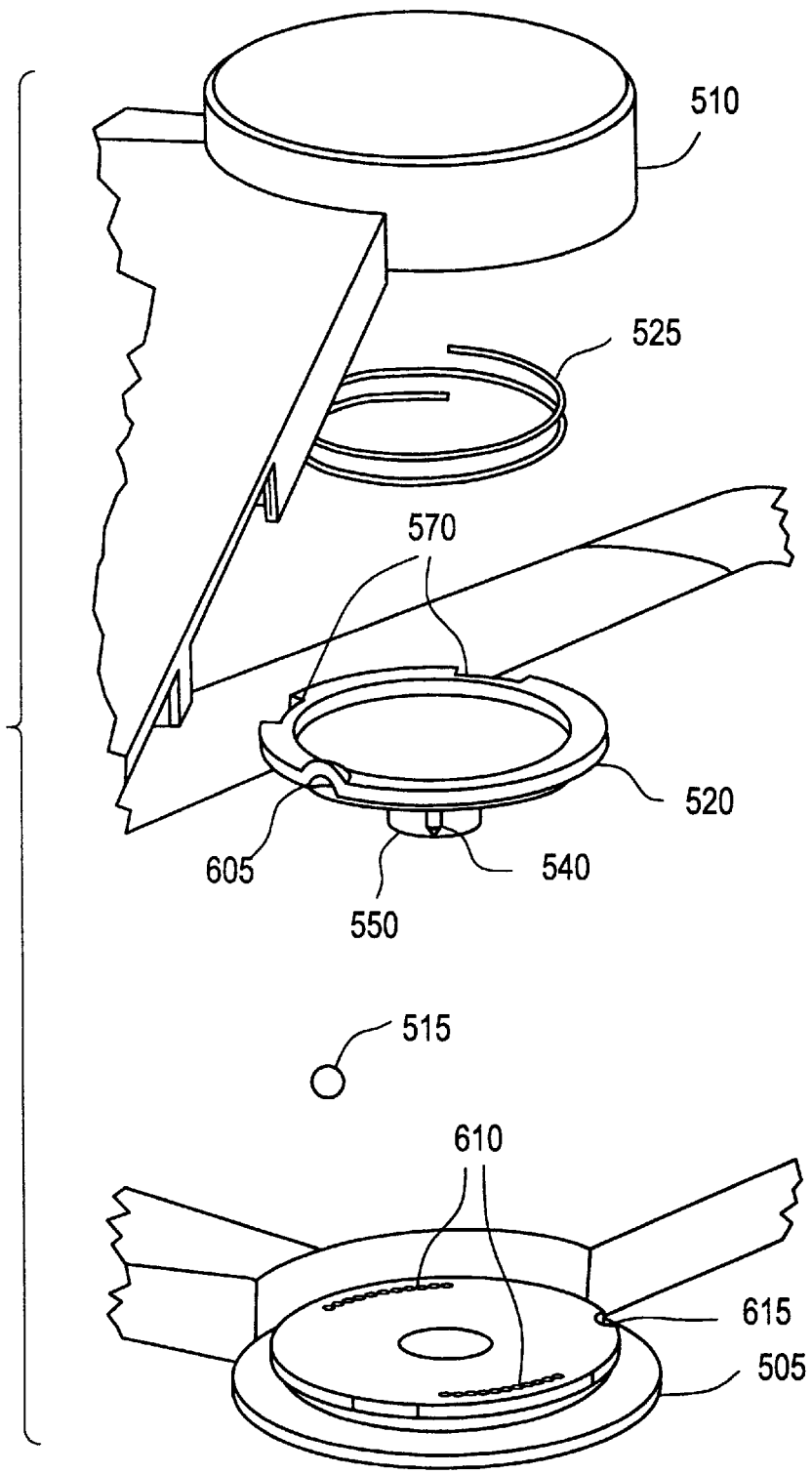

Now referring to FIGS. 6A and 6B, LH keyboard 430, RH keyboard 440, lower hinge area 510, and upper hinge area 505 are pictured from the opposite perspective. Biasing spring 525 is again shown to be disposed between lower hinge area 510 and detent adjuster 520. Likewise, clearance for snaps 570, visible tip 550, and detent ball 515 are illustrated again.

FIG. 6B also shows notch 605 with detent adjuster 520 and recess 615 with upper hinge area 505. The adjusting recesses 610 in upper hinge area 505 are designed to mate with locating pins 540. It can now be seen that once the detent adjuster 520 has been sufficiently depressed (depressed meaning that it approaches lower hinge area 510), then the locating pins 540 will descend below adjusting recesses 610. Once the locating pins 540 are freed from adjusting recesses 610, detent adjuster 520 can be rotated by the visible tip 550. Once arrow indicator 555 has been rotated to the desired element (desired because it is known that the element corresponds to the most comfortable v-angle or desired because it is the next element to try for determining the most comfortable v-angle) in the indication features 560, pressure on detent adjustor 520 is released, and detent adjustor 520 ascends toward upper hinge area 505 because of the force from biasing spring 525.

Essentially simultaneously, locating pins 540 ascend and enter adjusting recesses 610 in recesses that differ from those that were occupied before detent adjustor 520 was rotated. Once the adjustable hinge is set in this fashion, the v-keyboard can be closed. Upon opening the keyboard, it will automatically open to the most-recently-set v-angle, as determined by which recesses of the adjusting recesses 610 the locating pins 540 are in and as indicated by the arrow indicator 555 in conjunction with the indication features 560. Thus the setting process (or resetting process) is complete.

The currently-set v-angle is the current operable angle. Thus, the operable angle changes based on the setting of the adjustable hinge detent, as can be determined by indication features in conjunction with an arrow indicator. Moreover, a plurality of operable angles can be made available to the user if so warranted. For instance, if the adjustable hinge detent is incorporated into a stand that frequently would be useful at two different set, or operable, angles, then a preferred adjustable embodiment can be modified by incorporating a plurality of notches 605 into the detent adjustor 520 along with a plurality of arrow indicators 555.

In summary as to this point, one purpose of the adjustable hinge detent is to provide a user with the ability to set a preferred v-angle of an opened v-keyboard, and then the v-keyboard "remembers" the preferred v-angle until the user decides to change it. The first adjustable embodiment, which is presently a preferred adjustable embodiment, is further illustrated in FIGS. 7–12.

Figure 7B:
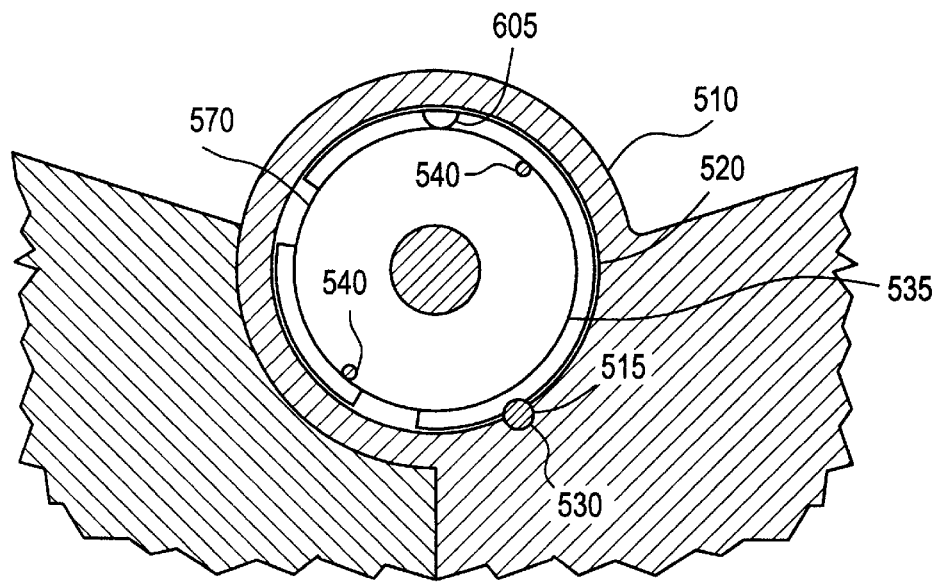
FIGS. 7, 7A, and 7B show views of the first adjustable embodiment in the closed position.
Figure 7:
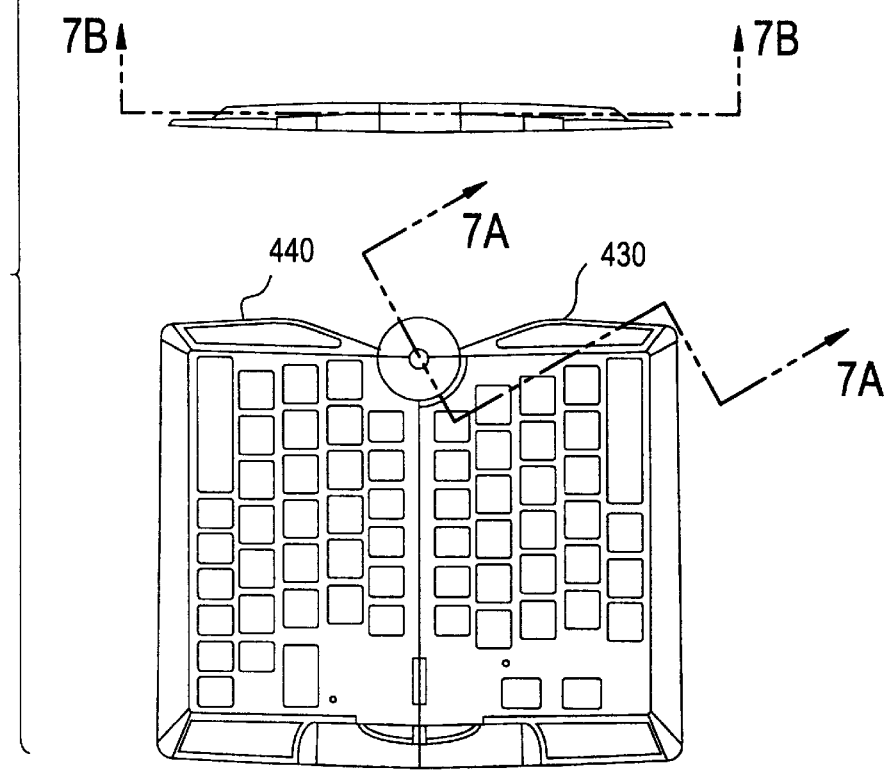
Figure 7A:
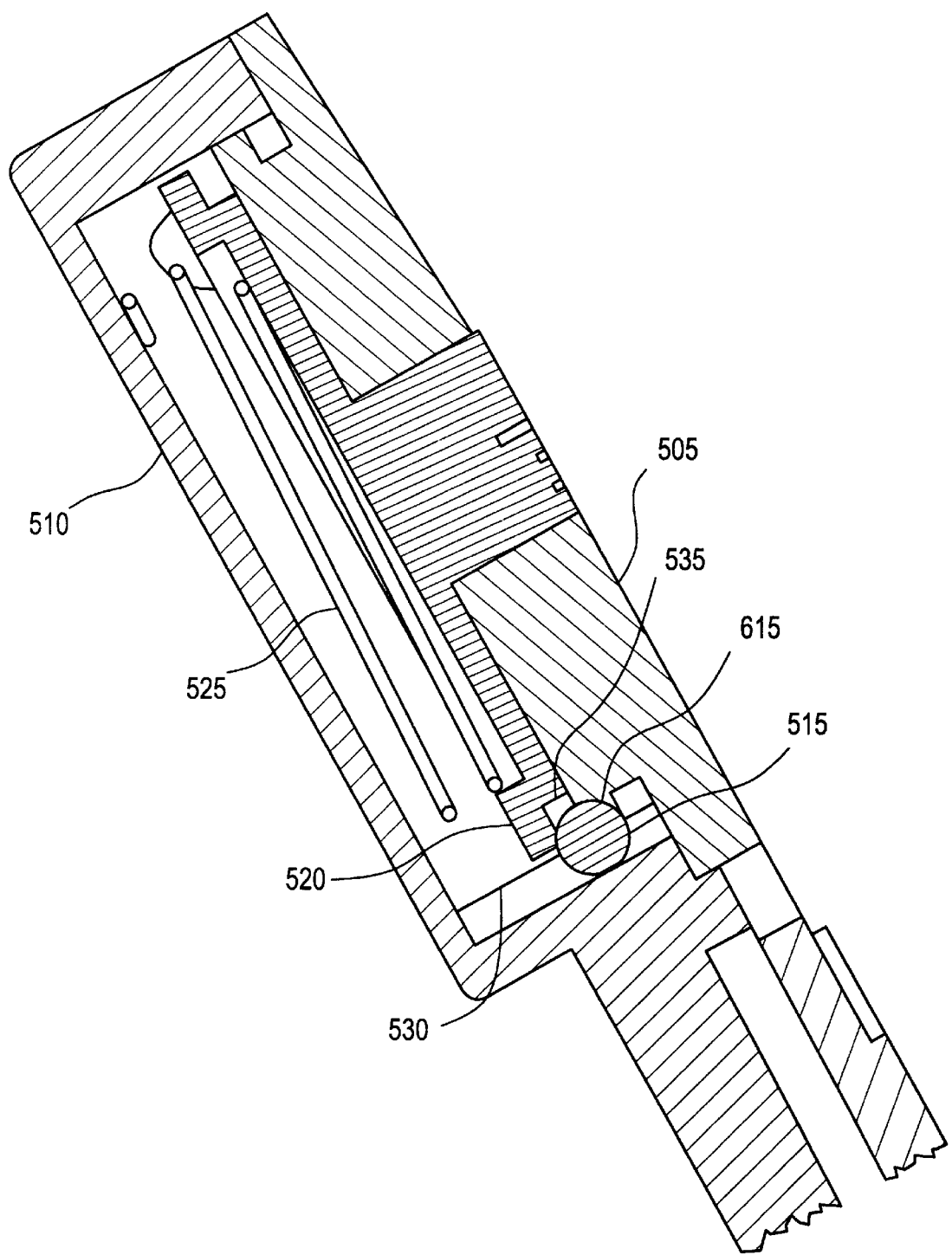

Referring to FIGS. 7, 7A, and 7B, cross-sectional views of the keyboard at the closed position are shown. In this position, the detent ball 515 is biased into a recess 615 in the upper hinge area 505 of the RH keyboard 440 by the detent adjustor 520 and the biasing spring 525. In addition, the detent ball 515 is maintained within the locating groove 530 in the lower hinge area 510 of the LH keyboard 430. Note that the detent adjustor 520 has a raised section 535 to further maintain the detent ball 515 in the locating groove 530.

As the keyboard halves are separated or opened about the hinge pivot point, the detent ball 515 is forced downward to react against the biasing spring 525 and detent adjuster 520, as the recess 615 in the upper hinge area 505 of the RH keyboard 440 is rotated out of position.

Figure 8B:
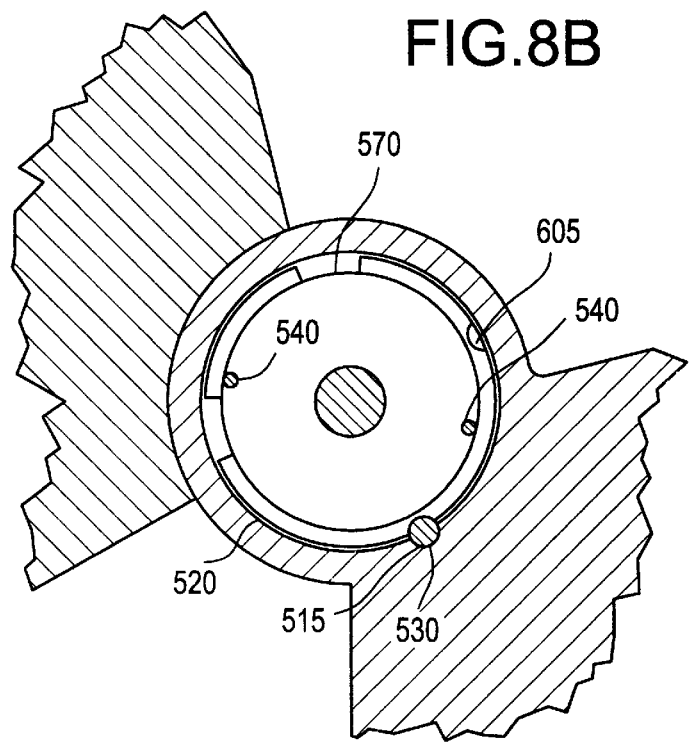
FIGS. 8, 8A, and 8B show views of the first adjustable embodiment in an opening position.
Figure 8:
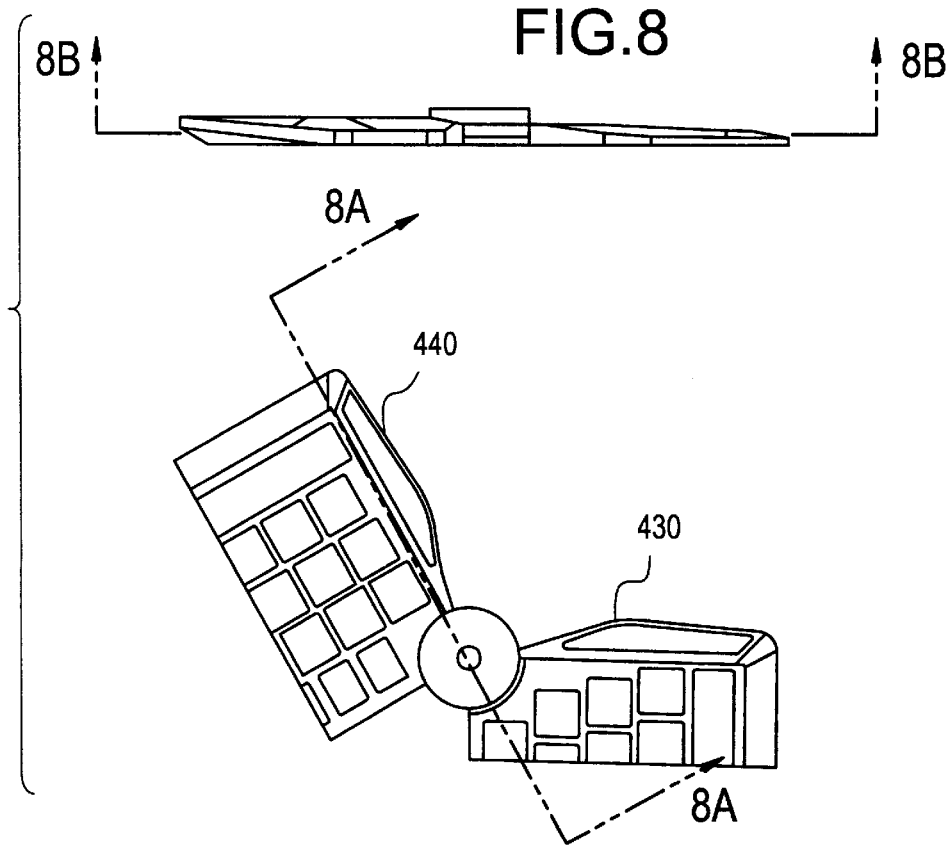
Figure 8A:
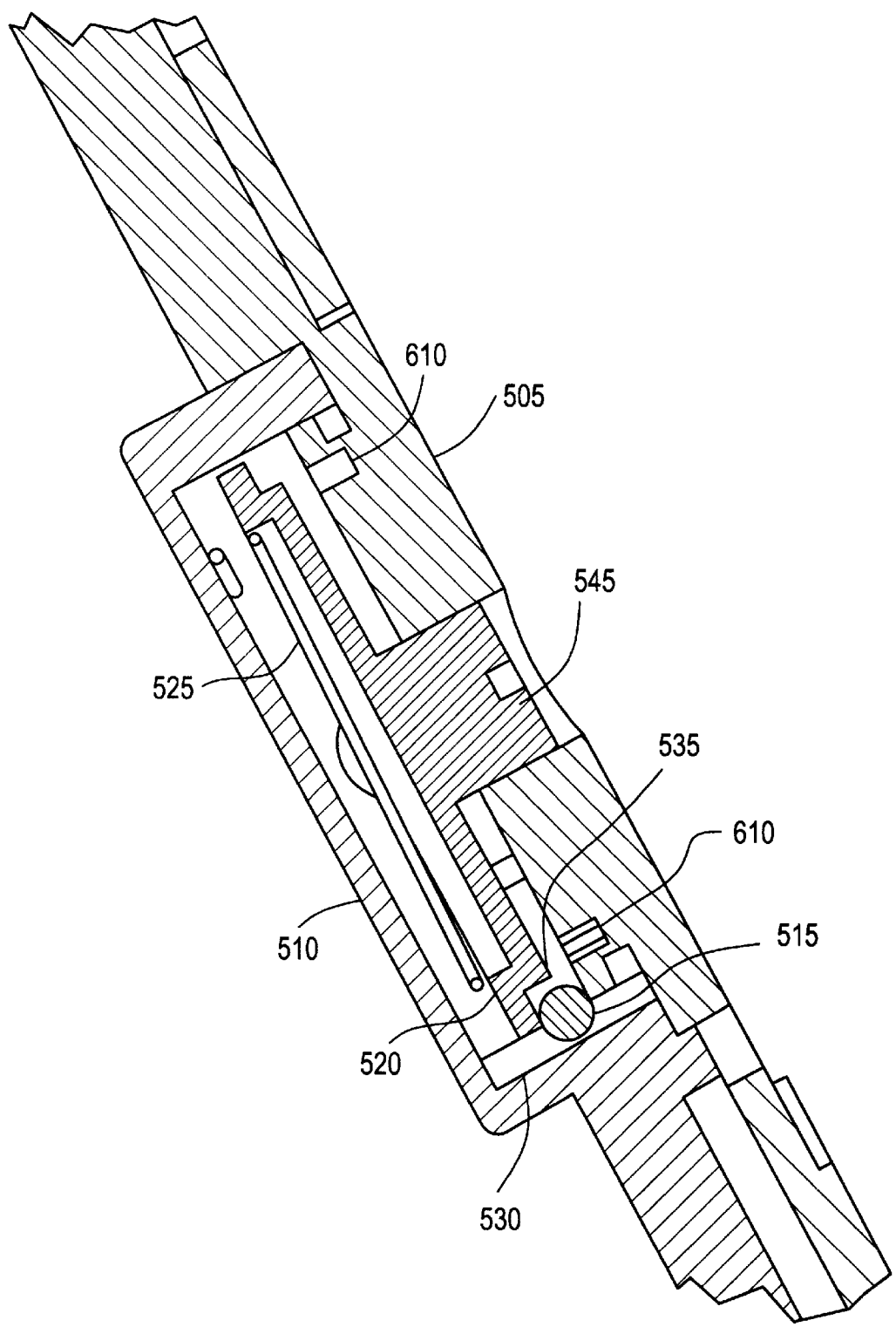

Referring to FIGS. 8, 8A, and 8B, cross-sectional views of the keyboard in an opening position are shown. In this position, the keyboard halves are at some point between the fully closed position and the desired open position (preferred v-angle). Again, the detent ball 515 is maintained in the same angular location with respect to the LH keyboard 430 by the locating groove 530 in the lower hinge area 510 of the LH keyboard 430 and the raised section 535 of the detent adjustor 520.

Figure 9B:
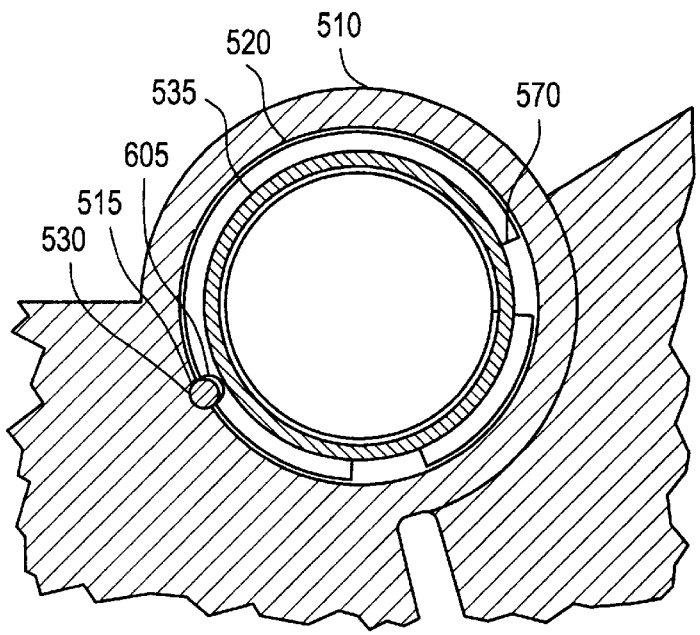
FIGS. 9, 9A, and 9B show views of the first adjustable embodiment in an open position.
Figure 9:
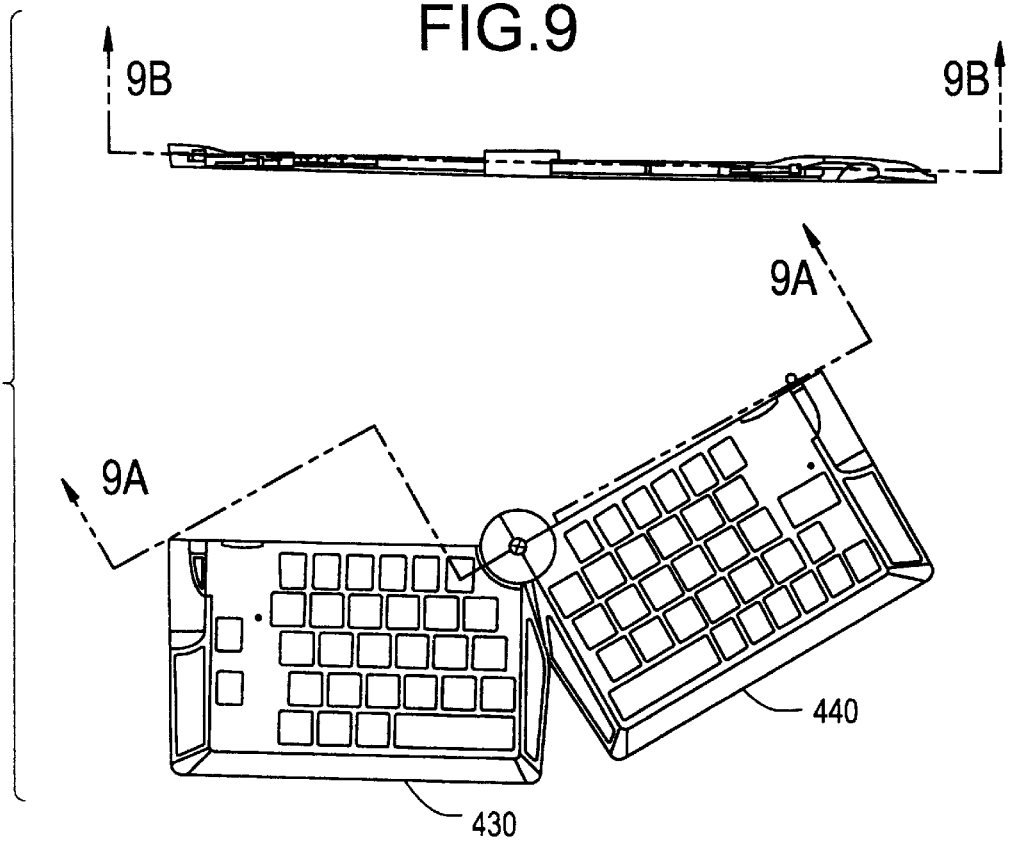
Figure 9A:
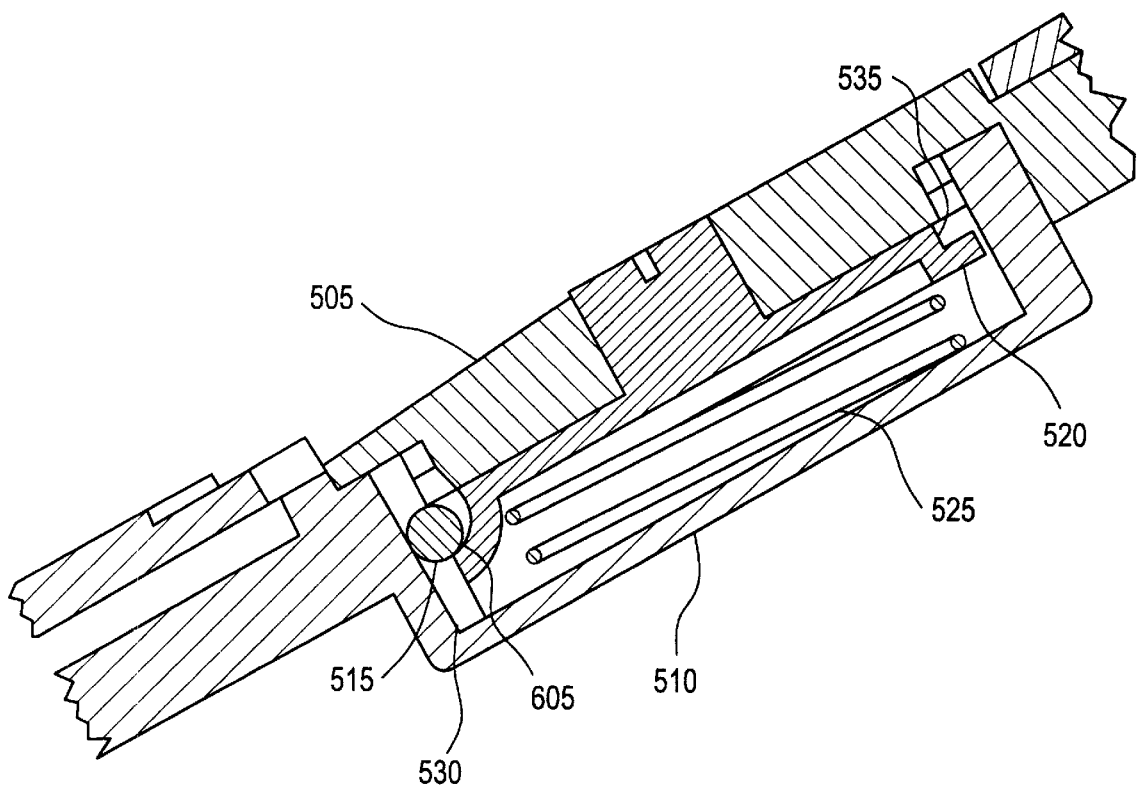

Referring now to FIGS. 9, 9A, and 9B, cross-sectional views of the keyboard in a desired open position are shown. As the keyboard halves have reached the desired open position, the notch 605 in the detent adjustor 520 becomes aligned with the position of the detent ball 515 (and subsequently with the locating groove 530 in the RH keyboard 440). As shown in FIG. 9A, the biasing spring 525 forces the detent adjustor 520 to trap the detent ball 515 within the notch 605 in the detent adjustor 520, giving the detent or locating feel to the user to indicate that the halves are in the desired v-angle position.

When the keyboard halves are moved back to the closed position, the hinge functions in an identical but reversed mode.

As explained above, the locating groove 530 in the lower hinge area 510 of the LH keyboard 430 maintains the detent ball 515 with respect to the LH keyboard 430 angular position. Now consider the features that maintain the detent adjustor 520 to the RH keyboard 440.

Figure 10B:
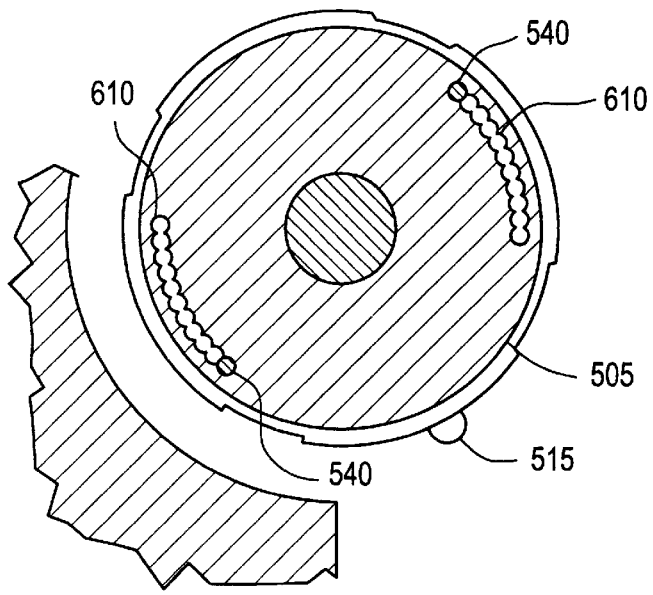
FIGS. 10, 10A, and 10B show views of the first adjustable embodiment.
Figure 10:
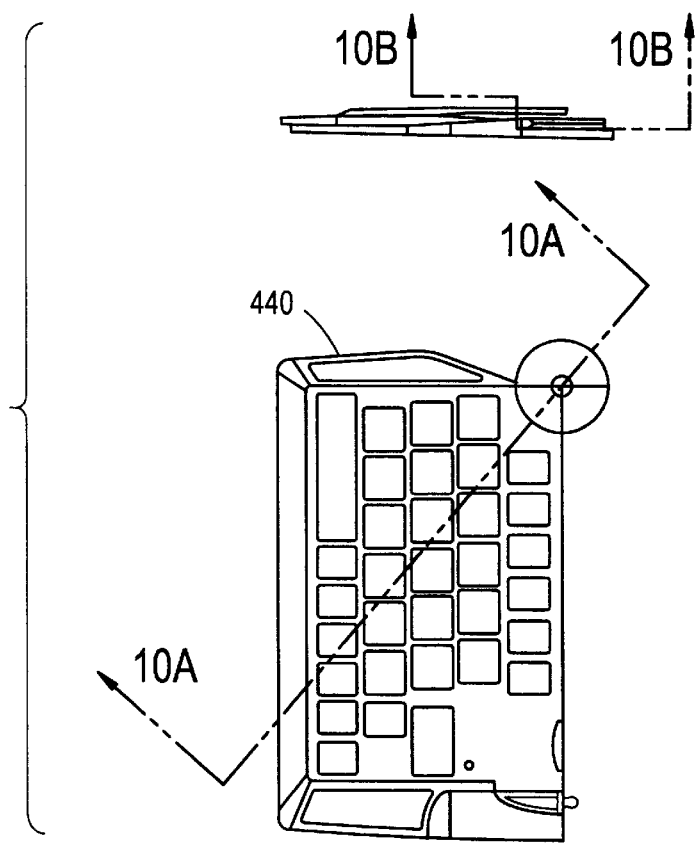
Figure 10A:
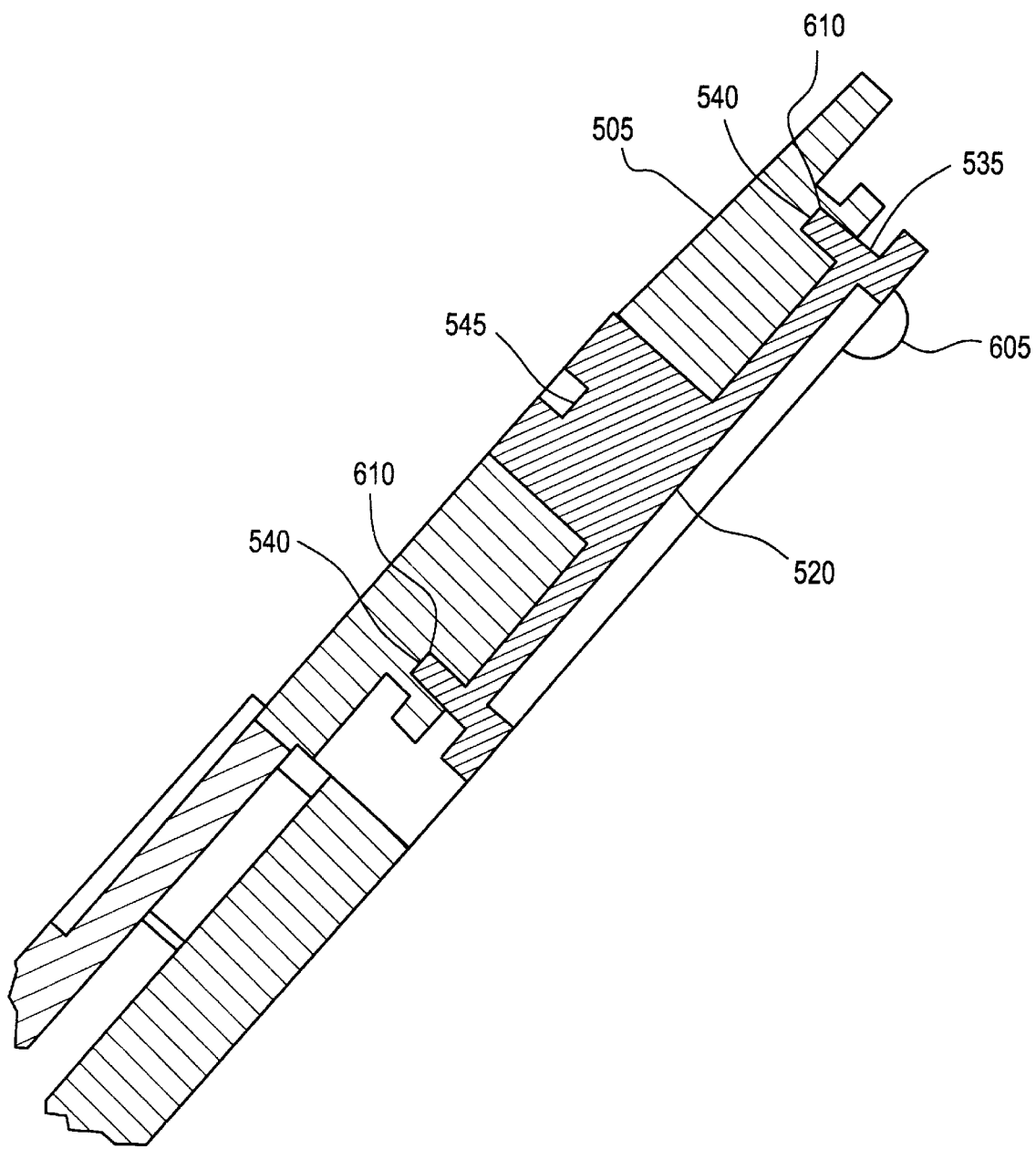

The sectional views in FIGS. 10, 10A, and 10B illustrate how the detent adjustor 520 is maintained against the RH keyboard 440. Preferably, two locating pins 540, which form a part of the detent adjustor 520, extend outward into mating adjusting recesses 610 in the upper hinge area 505 of the RH keyboard 440. These locating pins 540 maintain the detent adjustor 520 in the desired angular location to the RH keyboard 440 regardless of the motion of the RH keyboard 440.

It is important that the length of the locating pins 540 be sufficient to maintain this interaction even as the detent adjustor 520 is forced down (away from the upper hinge area 505 of the RH keyboard 440) by the detent ball 515 as the keyboard halves transition from fully closed to the desired open position, or vice versa. It should be noted that locating pins 540 are not the only implementation within the scope of the present invention. They could be replaced, for instance, by ribs, ridges, or any other type of means that ensures the detent adjustor 520 is maintained with respect to the RH keyboard 440. Another possible type of means is friction. Sufficient friction can be developed, for instance, by using a biasing spring 525 with a strong constant, by employing different materials such as rubber to gain a larger coefficient of friction, or by some combination thereof. Other possible frictional implementations, including the substitution of other high-friction materials, will become apparent to the artisan after reading and understanding the principles of the invention.

Figure 12:
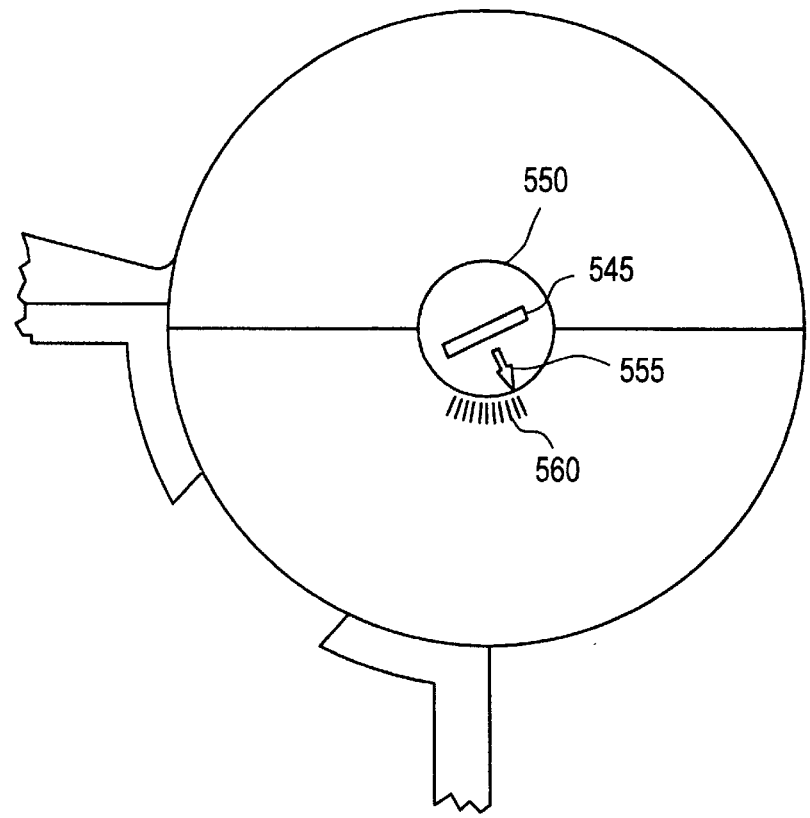
FIGS. 11, 11A, and 12 show views of the first adjustable embodiment that relate to setting the v-angle.
Figure 11:
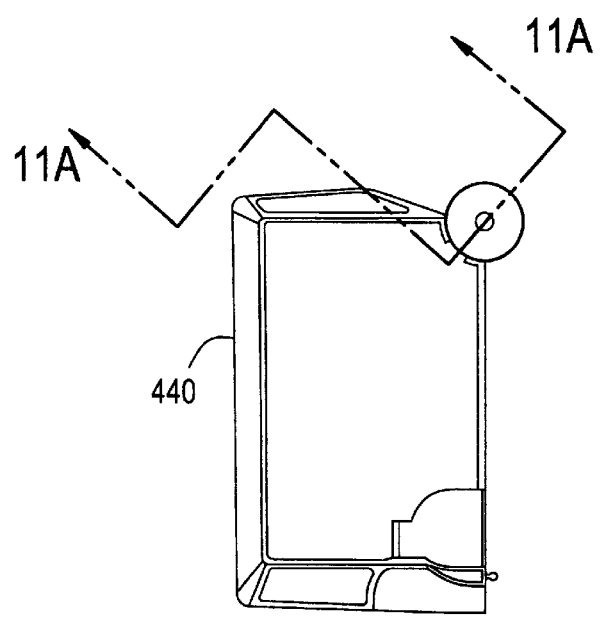
Figure 11A:
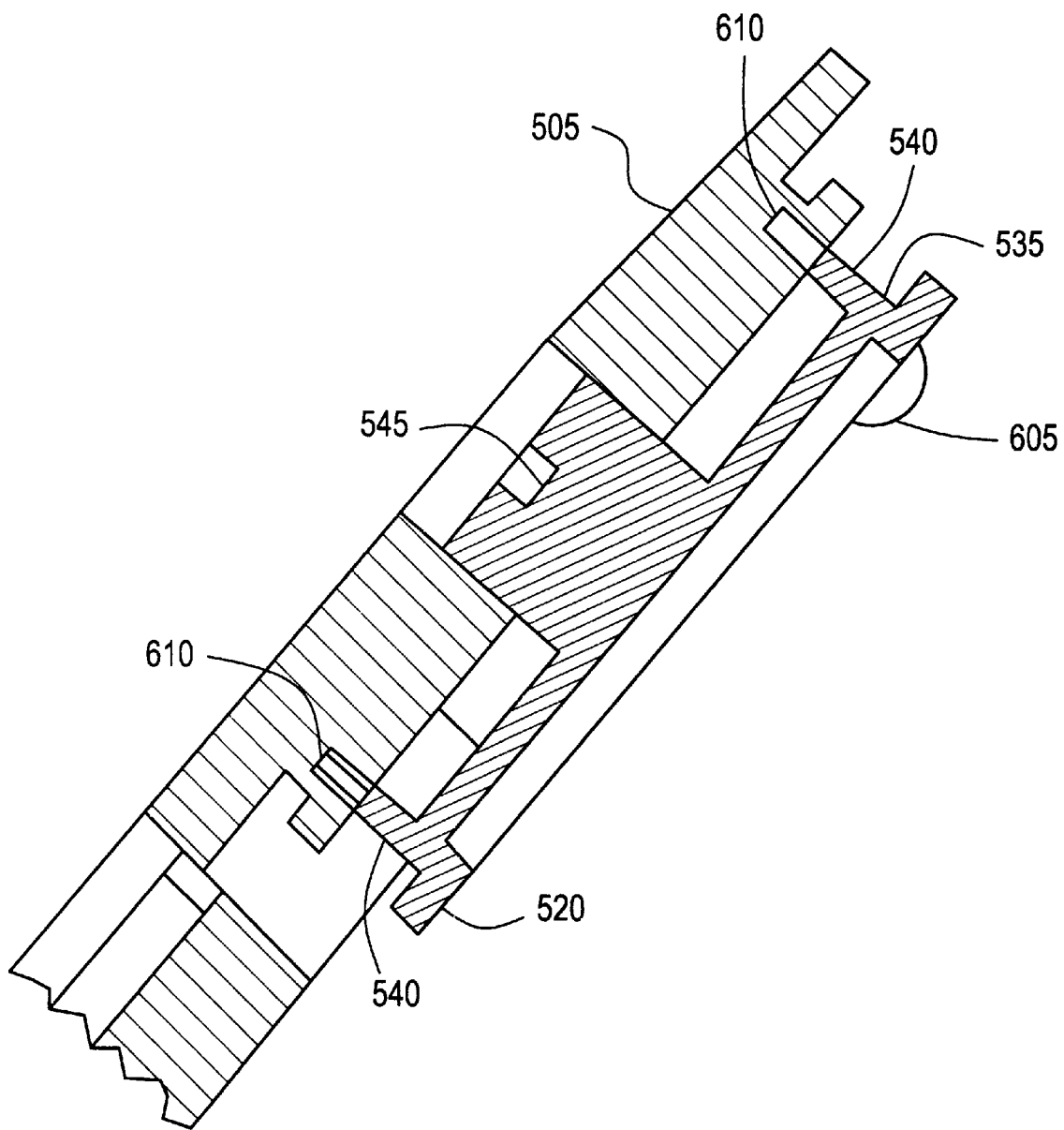

Referring to FIGS. 11, 11A, and 12, these views illuminate the adjusting process that allows the user to set the desired open position detent. Again, taken in the closed position, the user would insert a screw driver or other such device into slot 545, or equivalent feature, provided on the visible tip 550 of the detent adjustor 520. By applying pressure to the visible tip 550 in the downward direction, the detent adjustor 520 is forced down, which compresses the biasing spring 525. It is important that the spring deflection and distance between the bottom of the detent adjustor 520 and the lower hinge area 510 of the LH keyboard 430 be sufficient to allow the detent adjustor 520 to travel downward enough to fully separate the locating pins 540 on the detent adjustor 520 from the adjusting recesses 610 in the upper hinge area 505 of the RH keyboard 440.

The detent adjustor 520 can then be rotated (e.g., by way of turning the screw driver or other equipment) until the desired angular location is achieved. The arrow indicator 555 feature on the visible tip 550 of the detent adjustor 520 aligns with similar indication features 560 visible to the user on the RH keyboard to indicate at what open setting the detent is located. When pressure is removed from the visible tip 550, the biasing spring 525 once again forces the detent adjustor 520 upward, trapping the detent ball 515. Again the locating pins 540 maintain this new open detent position with respect to the RH keyboard.

Figure 13:
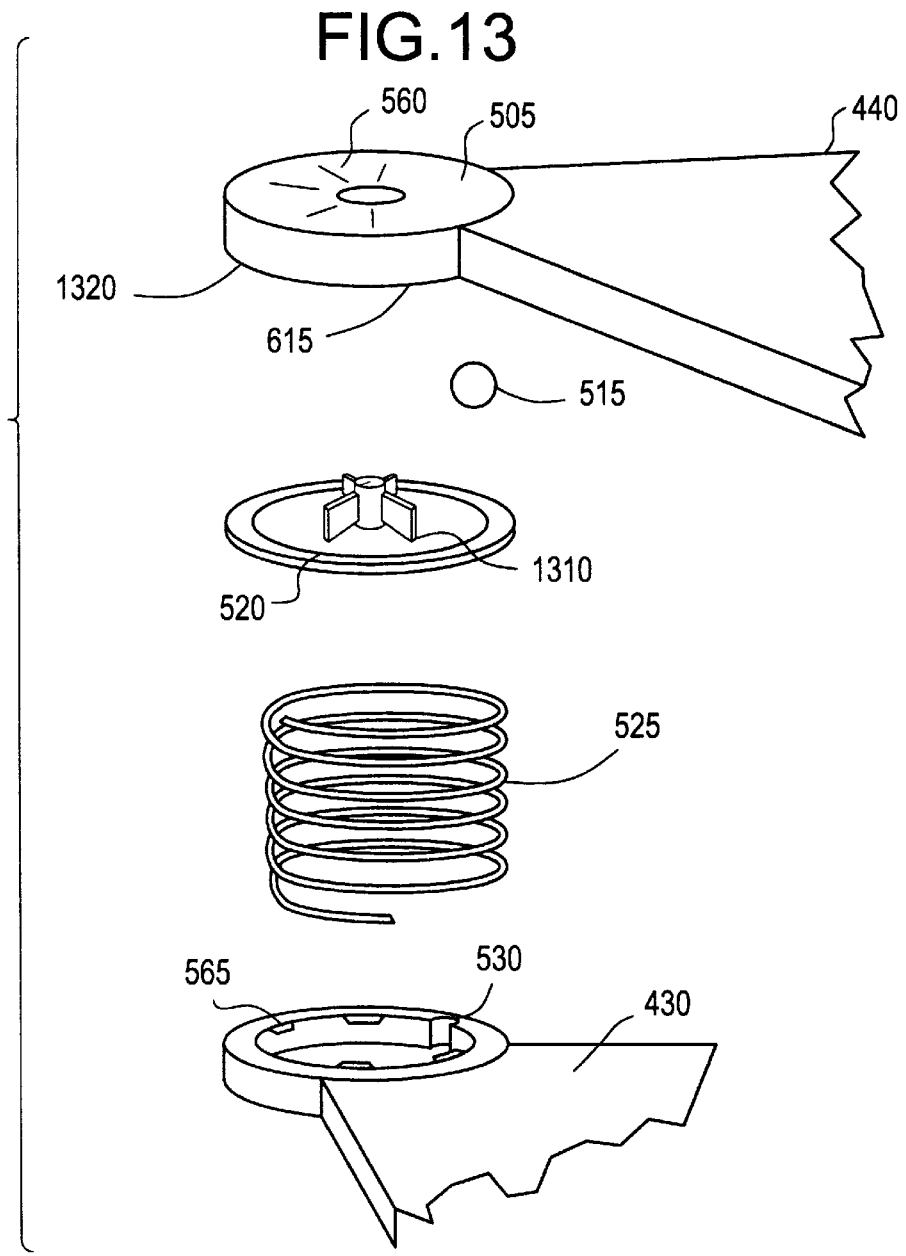
FIGS. 13 and 14 illustrate an exploded view of the second adjustable embodiment of the invention.

Referring now to FIG. 13, a second adjustable embodiment of the invention is illustrated. This second adjustable embodiment includes modifications to the first adjustable embodiment. The recess 615 is denoted in the underside of upper hinge area 505 where it is located, but hidden from view in FIG. 13. Locating ribs 1310 are preferably substantially perpendicular to the plane of detent adjustor 520. The locating ribs 1310 are substituted for the locating pins 540 of the first adjustable embodiment. Correspondingly, the adjusting recesses 610 of the first adjustable embodiment are replaced by slotted adjusting recesses 1320 to properly accommodate locating ribs 1310.

Numerous conditions should be noted. First, the rib height is preferably greater than the detent ball 515's diameter to ensure that detent adjustor 520 rotates with RH keyboard 440. Second, the number of ribs and their orientation preferably dictate the options and proportionality of the possible detent angles. Third, many other locating elements, beyond pins, ribs, and ridges, can be used in the adjustable hinge detent of the present invention. Fourth and finally, it is noted that biasing spring 525 preferably allows the detent adjustor 520 to descend more than the rib height to allow for adjusting the detent angle.

Figure 14:
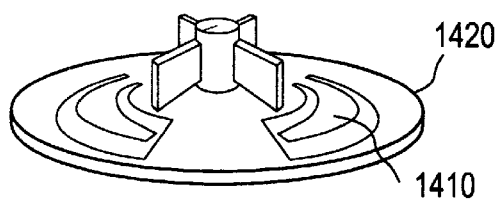

Turning now to FIG. 14, a modification of both the first and second adjustable embodiments is illustrated. The prior biasing spring 525 can, instead of being a separate element, be incorporated into the detent adjustor 520 or another element such as either upper hinge area 505 or lower hinge area 510. Biasing spring 1410 is pictured incorporated into modified detent adjustor 1420. While stamped spring fingers comprise biasing spring 1410, other spring structures can also be utilized.

Figure 15:
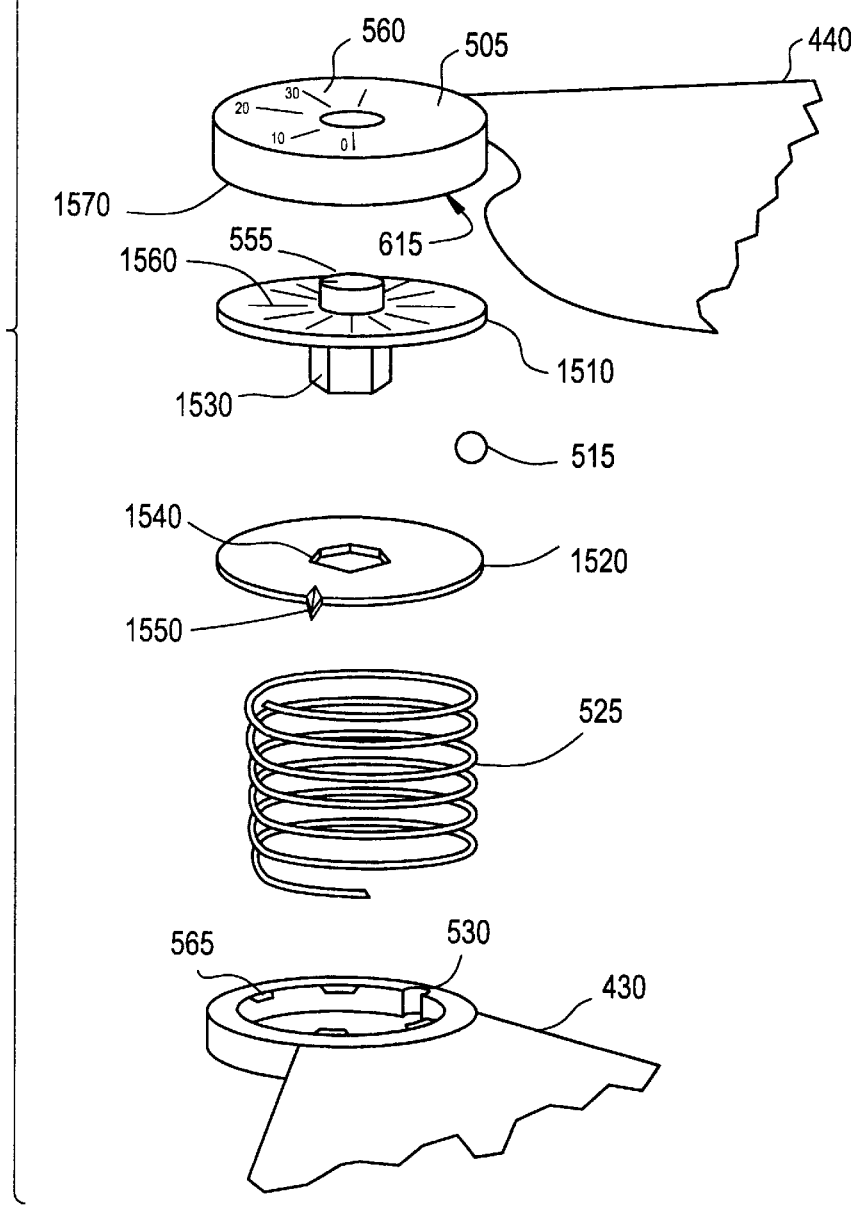
FIGS. 15 and 16 illustrate an exploded view of the third adjustable embodiment of the invention.

Referring now to FIG. 15, the third adjustable embodiment is illustrated. The detent adjustor 520 has been replaced with dial 1510 and detent plate 1520. Each is displaced between upper hinge area 505 and biasing spring 525 and maintained in position with snap features 565, which hold LH keyboard 430 and RH keyboard 440 together. Dial 1510 includes a downward extending dial key 1530 which mates with the keymate 1540 in detent plate 1520. Rotating dial 1510 then rotates detent plate 1520 and thus detent plate ball recess 1550. This third adjustable embodiment also illustrates another locating element. This adjustable embodiment includes first rough surface 1560 on dial 1510 and second rough surface 1570 on the underside of upper hinge area 505; the second rough surface 1570 accommodates, or mates, with the first rough surface 1560. In the third adjustable embodiment, the detent ball 515 travels in a circular path until it reaches the detent plate ball recess 1550, which provides the detent feel as the ball catches in the recess. Rotating dial 1510, through dial key 1530 and keymate 1540, rotates the detent plate ball recess 1550. This interaction permits the detent angle, a v-angle in the preferred keyboard adjustable embodiment, to be set and later changed. It should be noted that dial 1510's diameter is preferably less than the area the ball will travel such that the ball can mate with recess 615 on the underside of upper hinge area 505.

Figure 16:
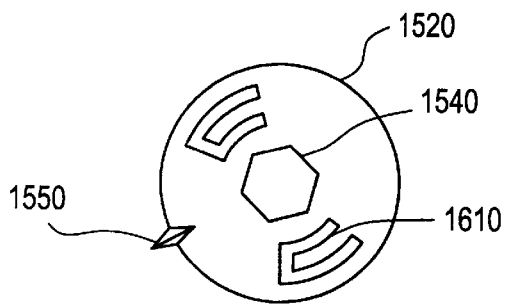

Turning now to FIG. 16, it is illustrated how biasing spring 525 can be incorporated into detent plate 1520. Incorporated biasing spring 1610 is also shown with spring fingers, and here, too, other spring structures can be utilized instead.

Figure 17:
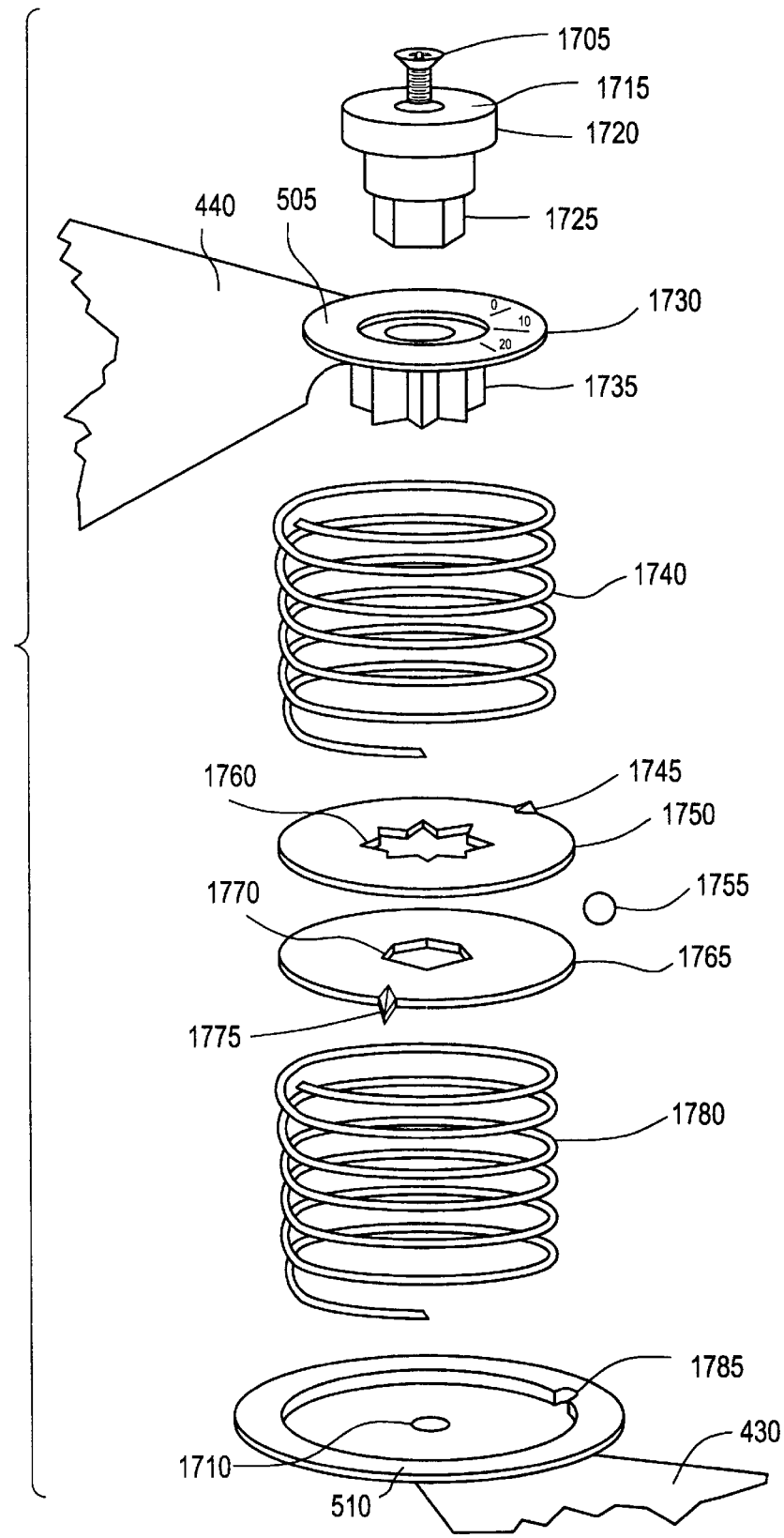
FIG. 17 illustrates an exploded view of the fourth adjustable embodiment of the invention.

Referring to FIG. 17, the fourth adjustable embodiment is illustrated. This adjustable embodiment is preferably interconnected by assembly screw 1705, which is received by threaded hole 1710, located in lower hinge area 510. Other assembly techniques can be used; for instance, it can be pinned, riveted, etc. Beneath assembly screw 1705 is hand-rotatable dial 1720, which passes through upper hinge area 505. Hand-rotatable dial 1720 is used to control the detent angle, preferably a v-angle of a v-keyboard.

Hand-rotatable dial 1720 also includes an indicator notch 1715 disposed on its upper surface, and upper hinge area 505 also includes angle indication features 1730. As was diagramed above (and termed in that context a visible tip), the hand-rotatable dial as pictured at 1720 can be slightly modified so that it can be operated with tools, e.g., a screwdriver. Such a modification is within the ordinary skill of an artisan. Thus, dials can include visible tips, and vice versa.

Disposed between upper hinge area 505 and lower hinge area 510 are first biasing spring 1740, first detent plate 1750, second detent plate 1765, and second biasing spring 1780. Hand-rotatable dial key 1725 is designed to mate with second keymate 1770, which is provided in second detent plate 1765. Upper hinge area key 1735 is designed to mate with first keymate 1760, which is provided in first detent plate 1750.

The fourth adjustable embodiment further includes the following elements. First, detent ball 1755 rests in ball-trapping recess 1785, which is located in lower hinge area 510. Second, first detent plate 1750 includes first detent plate ball recess 1745, and second detent plate 1765 includes second detent plate ball recess 1775.

It is noted that hand-rotatable dial 1720, hand-rotatable dial key 1725, and therefore second detent plate 1765 are frictionally held in place when not intentionally being rotated. Alternatively, notches, teeth, etc. can be elements employed to ensure that the parts maintain their location relative to the hinged parts 430 (LH keyboard) and 440 (RH keyboard).

Continuing with the operational explanation, detent ball 1755 preferably remains within ball-trapping recess 1785, also termed a locating groove above, throughout the hinging movement. In a closed position, detent ball 1755's position is maintained with a snap feel by first detent plate ball recess 1745. As hinged parts 430 and 440 begin to open, first biasing spring 1740 is depressed as detent ball 1755 snaps out of first detent plate ball recess 1745 and begins to travel in a circular path, propelled by ball-trapping recess 1785. When detent ball 1755 reaches second detent plate ball recess 1775, second biasing spring 1780 is expanded and contracted and detent ball 1775 snaps into second detent plate ball recess 1775.

Therefore, changing the operable angle of the keyboard is achieved by rotating the hand-rotatable dial 1720 and hence operationally connected second detent plate 1765. It should be noted that incorporating first and second biasing springs 1740 and 1780 into one or more detent plates is equally within the scope of the invention for this fourth adjustable embodiment, but is not specifically illustrated.

Figure 18:
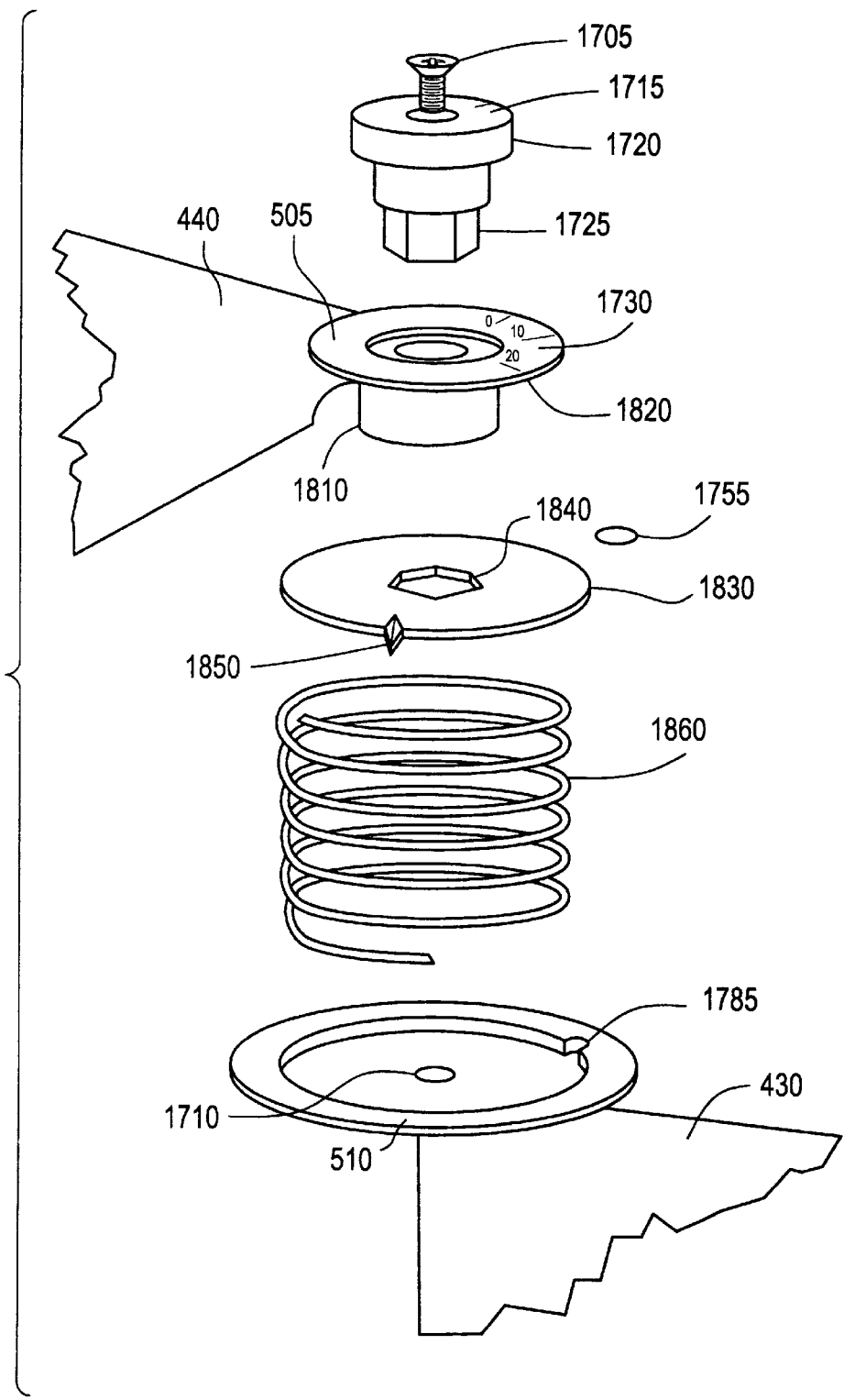
FIG. 18 illustrates an exploded view of the fifth adjustable embodiment of the invention.

Referring to FIG. 18, the fifth adjustable embodiment is illustrated. The fifth adjustable embodiment is similar to the fourth adjustable embodiment in both design and operation. Upper hinge area key 1735, first biasing spring 1740, and first detent plate 1750 are removed. A recess 1820 is then provided in upper hinge area 505 to accommodate detent ball 1755 in the closed position. Un-keyed element 1810 serves to reinforce the absence of upper hinge area key 1735.

Hand-rotatable dial key 1725 mates with keymate 1840, which is provided in detent plate 1830. Again, a biasing spring 1860 provides an upward force against detent plate 1830. When detent ball 1755 reaches the detent plate ball recess 1850, the user receives a snap feel to communicate that the two keyboard parts 430 and 440 have reached the set detent v-angle. It is noted here again that biasing spring 1860 can be incorporated into another element of the hinge; for example, detent plate 1830, lower hinge area 510, or upper hinge area 505 can include an incorporated spring.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, the adjustable hinge detent can be utilized in collapsing headphones, folding laptop computer screens, tiltable mechanical stands for various devices, etc.

What is claimed is:

1. A hinged electronic apparatus, comprising:
   a first hinged portion, said first hinged portion including at least one key;
   a second hinged portion, said second hinged portion including at least one key;
   a hinge portion, said hinge portion enabling said first hinged portion to rotate with respect to said second hinged portion;
   a detent operatively connected to said hinge portion, said detent including a plurality of detent positions, said detent thereby capable of establishing a plurality of predetermined positions; and
   wherein said detent includes a detent adjustor, said detent adjustor rotatable to set an individual position from said plurality of predetermined positions, said detent adjustor capable of being operably rotated while said first hinged portion is in an approximately fixed relationship with said second hinged portion.

2. The hinged electronic apparatus of claim 1, wherein:
   said first and second hinged portions form at least part of a keyboard.

3. The hinged electronic apparatus of claim 1, wherein:
   said detent adjustor includes a notch at a periphery of said detent adjustor, and said detent adjustor further includes means for adjusting said notch angularly and for fixing said notch at varying angular distances from a detent instrument held by at least one of a locating groove and a recess.

4. The hinged electronic apparatus of claim 1, wherein:
   said detent adjustor further includes at least one locating element.

5. The hinged electronic apparatus of claim 1, wherein:
   said first hinged portion further includes an associated first hinged area;
   said second hinged portion further includes an associated second hinged area; and
   said detent further includes a spring that biases said detent adjustor and a detent instrument for establishing, at least partially, said individual position from said plurality of predetermined positions.

6. The hinged electronic apparatus of claim 5, wherein:
   said spring is integral with said detent adjustor.

7. The hinged electronic apparatus of claim 5, wherein:
   said first hinged area, which is associated with said first hinged portion, includes at least one indication feature on a side facing away from said second hinged area.

8. A method for operating an adjustable hinge of an electronic apparatus, the electronic apparatus having a first hinged portion that includes at least one key, a second hinged portion that includes at least one key, and a detent, said detent operatively connected to said first and second hinged portions therebetween and including a detent adjustor, the method comprising:

rotating said first hinged portion with respect to said second hinged portion to a first predetermined angle measurable between said first hinged portion and said second hinged portion;
   adjusting said detent adjustor, said detent adjustor adjustable from a first position establishing said first predetermined angle to a second position establishing a second predetermined angle by, at least in part, rotating said detent adjustor while said first hinged portion remains in an approximately constant angular relationship with said second hinged portion; and
   rotating said first hinged portion with respect to said second hinged portion to said second predetermined angle measurable between said first hinged portion and said second hinged portion.

9. The method for operating an adjustable hinge of claim 8, further comprising the step of:
   ascertaining a preferred angle measurable between said first hinged portion and said second hinged portion.

10. The method for operating an adjustable hinge of claim 9, wherein:
    said step of adjusting said detent adjustor further includes the step of setting said detent adjustor to a preferred position establishing said preferred angle.

11. The method for operating an adjustable hinge of claim 10, wherein:
    said preferred angle coincides with said second predetermined angle and said preferred position coincides with said second position.

12. The method for operating an adjustable hinge of claim 8, wherein:
    said first and second hinged portions form at least part of a keyboard and said steps of rotating further comprise the steps of rotating said at least part of a keyboard in a plane defined by said at least part of a keyboard.

13. An electronic device having an adjustable hinge, comprising:
    a first hinged portion, said first hinged portion including at least one key;
    a second hinged portion, said second hinged portion including at least one key;
    a hinge portion, said hinge portion enabling said first hinged portion to rotate with respect to said second hinged portion; and
    detent means in operative association with said first and second hinged portions and said hinge portion for setting at least one operable angle from between or among a plurality of possible operable angles between said first and second hinged portions, said detent means including at least one substantially disc-shaped component, said at least one substantially disc-shaped component adapted for operational rotation while said first hinged portion does not rotate with respect to said second hinged portion.

14. The electronic device having an adjustable hinge of claim 13, wherein:
    said detent means further includes a detent implement for snapping into a notch of said at least one substantially disc-shaped component.

15. An electronic device having an adjustable hinge, comprising:
    a first hinged portion, said first hinged portion including at least one key;
    a second hinged portion, said second hinged portion including at least one key;

a hinge portion, said hinge portion enabling said first hinged portion to rotate with respect to said second hinged portion;

detent means in operative association with said first and second hinged portions and said hinge portion for setting at least one operable angle from between or among a plurality of possible operable angles between said first and second hinged portions, said detent means including at least one substantially disc-shaped component; and wherein:

said at least one substantially disc-shaped component comprises a detent adjustor; and said detent means is disposed between said first and second hinged portions and further includes
a detent instrument and
a spring, said spring biasing said detent adjustor.

16. The electronic device having an adjustable hinge of claim 15, wherein:

said detent adjustor further includes at least one locating element attached to said detent adjustor; and a visible tip attached to said detent adjustor.

17. The electronic device having an adjustable hinge of claim 16, further comprising:

a first hinged area connected to said first hinged portion, said first hinged area including at least one indication feature;

a second hinged area connected to said second hinged portion, said second hinged area including at least one snap feature; and at least one recess for said detent instrument on any of said first hinged area, said second hinged area, or said detent adjustor.

18. The electronic device having an adjustable hinge of claim 15, wherein:

said first and second hinged portions form at least part of a keyboard.

19. An electronic device having an adjustable hinge, comprising:

a first hinged portion, said first hinged portion including at least one key;

a second hinged portion, said second hinged portion including at least one key;

a hinge portion, said hinge portion enabling said first hinged portion to rotate with respect to said second hinged portion;

detent means in operative association with said first and second hinged portions and said hinge portion for setting at least one operable angle from between or among a plurality of possible operable angles between said first and second hinged portions, said detent means including at least one substantially disc-shaped component; and wherein:

said at least one substantially disc-shaped component comprises a detent plate; and said detent means further includes
a dial,
a key for engaging said detent plate, said key extending from said dial, and
a spring, said spring biasing said detent plate.

20. The electronic device having an adjustable hinge of claim 19, wherein:

said spring is incorporated into said detent plate.

21. The electronic device having an adjustable hinge of claim 19, wherein:

said dial is capable of being adjusted by hand.

22. An electronic device having an adjustable hinge, comprising:

a first hinged portion, said first hinged portion including at least one key;

a second hinged portion, said second hinged portion including at least one key;

a hinge portion, said hinge portion enabling said first hinged portion to rotate with respect to said second hinged portion;

detent means in operative association with said first and second hinged portions and said hinge portion for setting at least one operable angle from between or among a plurality of possible operable angles between said first and second hinged portions, said detent means including at least one substantially disc-shaped component; and wherein:

said at least one substantially disc-shaped component comprises a first detent plate; and said detent means further includes
a dial,
a second detent plate,
a first key for engaging said first detent plate,
a second key for engaging said second detent plate, and
first and second springs for biasing said detent means.

23. An electronic device having a hinge with an adjustable detent mechanism for providing snap-feedback to a user, the hinge comprising:

a first portion, said first portion including a locating groove and at least one key;

a second portion, said second portion including at least one first mating structure and at least one key;

a hinge portion, at least part of said hinge portion disposed between said first and second portions, said hinge portion enabling said first portion to rotate with respect to said second portion;

a detent adjustor, at least part of said detent adjustor disposed between said first and second portions, said detent adjustor including at least one notch and at least one second mating structure in operative alignment with said at least one first mating structure;

a detent instrument shaped to fit within said locating groove; and wherein said first and second portions are rotatably connected via said hinge portion, and said at least one first mating structure and said at least one second mating structure are adjustably engaged so as to hold said detent adjustor in a constant angular position with respect to said second portion.

24. The electronic device of claim 23, wherein said at least one first mating structure comprises at least one adjusting recess and said at least one second mating structure comprises at least one locating pin.

25. The electronic device of claim 23, wherein said at least one first mating structure and said at least one second mating structure comprise friction-inducing surfaces.

26. The electronic device of claim 23, wherein said at least one first mating structure and said at least one second mating structure comprise ridges.

27. An electronic device having a hinge with an adjustable detent mechanism for providing snap-feedback to a user, the hinge comprising:

a first portion, said first portion including a locating groove and at least one key;

a second portion, said second portion including at least one first mating structure and at least one key;

a hinge portion, at least part of said hinge portion disposed between said first and second portions, said hinge portion enabling said first portion to rotate with respect to said second portion;

a detent adjustor, at least part of said detent adjustor disposed between said first and second portions, said detent adjustor including at least one notch and at least one second mating structure in operative alignment with said at least one first mating structure;

a detent instrument shaped to fit within said locating groove;

wherein said first and second portions are rotatably connected via said hinge portion, and said at least one first mating structure and said at least one second mating structure are adjustable engaged so as to hold said detent adjustor in a constant angular position with respect to said second portion; and wherein the hinge further comprises a spring to bias said detent adjustor against said second portion, said spring permitting said detent adjustor to be depressed away from said second portion and rotated with respect thereto to thereby establish a different angular position with respect to said second portion.

28. An electronic device having an adjustably hinged keyboard, comprising:

a first portion of a keyboard;

a second portion of said keyboard;

a hinge, at least part of said hinge disposed between said first and second portions of said keyboard, said hinge rotatably connecting said first and second portions and thereby enabling said first portion to rotate with respect to said second portion to a first predetermined position; and a detent adjustor, at least part of said detent adjustor disposed between said first and second portions of said keyboard, said detent adjustor establishing said first predetermined position from between or among a plurality of predetermined positions, said detent adjustor adapted for establishing a second predetermined position from between or among said plurality of predetermined positions by operably rotating said detent adjustor while said first portion of said keyboard remains in an approximately constant angular position with respect to said second portion of said keyboard.

29. The electronic device of claim 28, wherein said detent adjustor is capable of operable rotation while being pushed or pulled out of a neutral position, said neutral position being alterably maintained by a biasing mechanism.

30. The electronic device of claim 29, wherein said biasing mechanism comprises at least one mating structure.

31. The electronic device of claim 30, wherein said at least one mating structure comprises at least one of (i) at least one adjusting recess, (ii) at least one locating pin, (iii) at least one friction-inducing surface, and (iv) a plurality of ridges.

32. The electronic device of claim 29, wherein said biasing mechanism comprises a spring.

* * * * *